(12) United States Patent
Hagen et al.

(10) Patent No.: US 9,428,336 B2
(45) Date of Patent: Aug. 30, 2016

(54) ROBOTIC STORAGE AND RETRIEVAL SYSTEMS

(75) Inventors: Daniel J. Hagen, Cottage Grove, MN (US); Charles E. Ridley, Red Wing, MN (US); Steven J. Austin, Minneapolis, MN (US); Thomas E. Jung, Welch, MN (US); Chad Stiernagle, Eden Prairie, MN (US)

(73) Assignee: PaR Systems, Inc., Shoreview ( * ) Notice: Subject to any disclaimer, the term of this patent is extended or adjusted under 35 U.S.C. 154(b) by 0 days.

(21) Appl. No.: 13/192,873

(22) Filed: Jul. 28, 2011

(65) Prior Publication Data
US 2012/0029687 A1    Feb. 2, 2012

Related U.S. Application Data

(60) Provisional application No. 61/368,399, filed on Jul. 28, 2010.

(51) Int. Cl.
*B65G 1/04* (2006.01)
*G07F 11/16* (2006.01)

(52) U.S. Cl.
CPC ........... *B65G 1/0407* (2013.01); *G07F 11/165* (2013.01)

(58) Field of Classification Search
CPC ................ B65G 1/0407; G07F 11/165
USPC .................... 700/218; 414/281, 280
See application file for complete search history.

(56) References Cited

U.S. PATENT DOCUMENTS

| | | | |
|---|---|---|---|
| 4,270,319 A | 6/1981 | Spasojevic | |
| 4,530,549 A * | 7/1985 | Genna | A47F 3/02 312/121 |
| 4,567,359 A | 1/1986 | Lockwood | |
| 4,591,070 A | 5/1986 | Wirstlin | |
| 5,206,814 A | 4/1993 | Cahlander et al. | |
| 5,362,197 A * | 11/1994 | Rigling | B65G 1/0407 198/347.3 |
| 5,544,996 A | 8/1996 | Castaldi et al. | |
| 5,595,263 A | 1/1997 | Pignataro | |
| 5,720,547 A * | 2/1998 | Baird | A47B 87/008 220/552 |
| 5,822,216 A | 10/1998 | Satchell, Jr. et al. | |

(Continued)

FOREIGN PATENT DOCUMENTS

| | | |
|---|---|---|
| CA | 1252430 A | 4/1989 |
| DE | 3941754 | 6/1991 |

(Continued)

OTHER PUBLICATIONS

PCT Search Report for PCT/US2011/045706, Dec. 28, 2011.
Written Opinion, International Application PCT/US2011/045706, Dec. 28, 2011.
International Preliminary Report on Patentability from the International Bureau of WIPO, Switzerland, in counterpart foreign application PCT/US2011/045706 filed Jul. 28, 2011.
B. Small Goods Storage B6. Miniload Single Store, copyright 2008,3 pages.

(Continued)

*Primary Examiner* — Thomas Randazzo
(74) *Attorney, Agent, or Firm* — Steven Koehler; Westman, Champlin & Koehler

(57) ABSTRACT

A robotic storage and retrieval system is provided. The robotic storage and retrieval system may include a three-dimensional storage rack, a set of article holders, and a robot. In one embodiment, the storage rack has a plurality of rows, a plurality of columns, and one or more support members at each unique row and column position. Each set of article holders is located at one of the unique row and column positions, and each article holder within a set is vertically supported by the one or more support members. The robot is configured to store the article holders to the storage rack and to retrieve the article holders from the storage rack.

15 Claims, 39 Drawing Sheets

(56) References Cited

U.S. PATENT DOCUMENTS

| | | | |
|---|---|---|---|
| 5,838,566 A | 11/1998 | Conboy | |
| 5,893,697 A * | 4/1999 | Zini | G07F 11/165 193/34 |
| 5,927,544 A | 7/1999 | Kanoh | |
| 6,059,092 A | 5/2000 | Jerue | |
| 6,064,921 A | 5/2000 | Pippin | |
| 6,210,093 B1 | 4/2001 | Hannen | |
| 6,321,138 B1 * | 11/2001 | Livesay | B65G 1/0414 198/346.1 |
| 6,360,904 B1 | 3/2002 | Schilb | |
| 6,393,339 B1 | 5/2002 | Yeadon | |
| 6,424,111 B1 * | 7/2002 | Romig | G11B 15/6835 318/567 |
| 6,490,502 B2 | 12/2002 | Fellows | |
| 6,535,790 B2 | 3/2003 | Nakano et al. | |
| 6,547,096 B1 | 4/2003 | Chirnomas | |
| 6,584,375 B2 | 6/2003 | Bancroft | |
| 6,609,047 B1 | 8/2003 | Lipps | |
| 6,688,451 B2 | 2/2004 | Derby | |
| 6,694,217 B2 | 2/2004 | Bloom | |
| 6,842,665 B2 | 1/2005 | Karlen | |
| 6,962,267 B2 | 11/2005 | Herzog | |
| 7,039,495 B1 | 5/2006 | Conboy | |
| 7,203,570 B2 | 4/2007 | Karlen | |
| 7,261,511 B2 | 8/2007 | Felder | |
| 7,364,050 B2 | 4/2008 | Guard | |
| 7,381,022 B1 | 6/2008 | King | |
| 7,444,204 B2 | 10/2008 | Chirnomas | |
| 7,530,473 B2 * | 5/2009 | Chirnomas | G07F 9/105 221/123 |
| 7,536,283 B2 | 5/2009 | Potter et al. | |
| 7,621,108 B1 | 11/2009 | Brastauskas | |
| 7,780,392 B2 | 8/2010 | Rogers | |
| 7,787,681 B2 | 8/2010 | Zhang | |
| 7,809,470 B2 | 10/2010 | Shoenfeld | |
| 7,896,243 B2 | 3/2011 | Herskovitz | |
| 7,988,015 B2 | 8/2011 | Paul | |
| 8,078,316 B2 * | 12/2011 | Blust | G06Q 10/087 700/232 |
| 8,092,140 B2 | 1/2012 | Baker | |
| 8,140,187 B2 | 3/2012 | Campbell | |
| 8,162,174 B2 | 4/2012 | Hieb | |
| 8,204,624 B2 | 6/2012 | Zini | |
| 8,239,062 B2 | 8/2012 | Vahlberg | |
| 8,281,553 B2 | 10/2012 | Kim | |
| 8,308,414 B2 * | 11/2012 | Schifman | G07F 11/44 100/10 |
| 8,374,967 B2 * | 2/2013 | Chirnomas | G07F 5/18 700/236 |
| 8,403,614 B2 | 3/2013 | Bastian | |
| 8,417,380 B2 | 4/2013 | Kuehnrich | |
| 8,494,672 B2 | 7/2013 | Chirnomas | |
| 8,494,673 B2 | 7/2013 | Miranda | |
| 8,571,700 B2 | 10/2013 | Keller | |
| 8,571,701 B2 | 10/2013 | Lunak | |
| 8,571,708 B2 | 10/2013 | Rob | |
| 8,620,472 B2 | 12/2013 | Mockus | |
| 8,632,294 B2 | 1/2014 | Subotincic | |
| 8,678,232 B2 | 3/2014 | Mockus | |
| 8,695,814 B2 | 4/2014 | Van | |
| 8,705,388 B2 | 4/2014 | Gong | |
| 8,706,293 B2 | 4/2014 | Lu | |
| 8,712,586 B2 | 4/2014 | Allinson | |
| 8,738,177 B2 | 5/2014 | Van | |
| 8,768,789 B2 | 7/2014 | Smith | |
| 9,224,137 B1 * | 12/2015 | Tomasi | G07F 17/16 |
| 2003/0120387 A1 | 6/2003 | Sherwin | B25J 15/0052 700/245 |
| 2004/0059463 A1 | 3/2004 | Coughlin | |
| 2004/0071539 A1 | 4/2004 | Anater, Jr. et al. | |
| 2004/0191032 A1 * | 9/2004 | Foulke | B65G 1/04 414/280 |
| 2005/0055361 A1 | 3/2005 | Deal | |
| 2005/0063801 A1 * | 3/2005 | Durand | B65G 1/0435 414/268 |
| 2005/0143857 A1 * | 6/2005 | Chirnomas | G07F 5/18 700/244 |
| 2005/0216120 A1 | 9/2005 | Rosenberg et al. | |
| 2005/0238465 A1 * | 10/2005 | Razumov | A47F 10/02 414/273 |
| 2006/0045674 A1 * | 3/2006 | Craven | B65G 1/02 414/277 |
| 2006/0182604 A1 * | 8/2006 | Clark | B25J 15/0616 414/736 |
| 2007/0071585 A1 | 3/2007 | Henkel | |
| 2008/0008568 A1 | 1/2008 | Harris et al. | |
| 2008/0122615 A1 * | 5/2008 | Shoenfeld | G08B 13/2402 340/540 |
| 2008/0284139 A1 | 11/2008 | Shockley | |
| 2009/0005905 A1 * | 1/2009 | Kuehnrich | G06Q 10/06311 700/241 |
| 2009/0164328 A1 | 6/2009 | Biship et al. | |
| 2009/0312864 A1 | 12/2009 | Hanel | |
| 2010/0017296 A1 * | 1/2010 | Spignesi, Jr. | G06F 19/3462 705/14.66 |
| 2010/0121481 A1 | 5/2010 | Talley et al. | |
| 2010/0138037 A1 * | 6/2010 | Adelberg | G06Q 10/087 700/241 |
| 2010/0234990 A1 | 9/2010 | Zini et al. | |
| 2011/0071928 A1 | 3/2011 | Young | |
| 2011/0153071 A1 * | 6/2011 | Claessen | G06Q 20/123 700/234 |
| 2011/0172815 A1 * | 7/2011 | Kim | G07F 17/0092 700/235 |
| 2011/0229296 A1 * | 9/2011 | van Ooyen | G07F 11/165 414/795.4 |
| 2012/0029685 A1 | 2/2012 | Keller et al. | |
| 2012/0029687 A1 | 2/2012 | Hagen et al. | |
| 2012/0033209 A1 | 2/2012 | Osterkamp et al. | |
| 2012/0101627 A1 | 4/2012 | Lert | |
| 2012/0104785 A1 | 5/2012 | Hixson et al. | |
| 2012/0136477 A1 * | 5/2012 | Merrow | G11B 17/225 700/218 |
| 2012/0219397 A1 | 8/2012 | Baker | |
| 2013/0123978 A1 | 5/2013 | Stark et al. | |
| 2013/0253700 A1 | 9/2013 | Carson et al. | |
| 2013/0297066 A1 | 11/2013 | Alvern | |
| 2014/0052498 A1 | 2/2014 | Marshall et al. | |
| 2014/0212250 A1 | 7/2014 | Wolter | |

FOREIGN PATENT DOCUMENTS

| | | |
|---|---|---|
| DE | 3941754 A1 | 6/1991 |
| EP | 0169156 | 1/1986 |
| EP | 0169156 A1 | 1/1986 |
| JP | 61150908 | 7/1986 |
| JP | 61150908 A | 7/1986 |
| WO | 2009065145 A1 | 5/2009 |
| WO | 2012019189 A2 | 2/2012 |

OTHER PUBLICATIONS

B. Small Goods Storage B6. Miniload Multi-store, copyright 2008,3 pages.

Invitation to Pay Additional Fees and Where Applicable, Protest Fee for corresponding PCT Application No. PCT/US2011/045706, filed Jul. 28, 2011, date of mailing Oct. 31, 2011, 4 pages.

Griffith, David, "Clerk? What's a Clerk?; Exton Entrepreneur Compresses an Entire Convenience Store into a Vending Machine"; Intellingencer Journal, Lancaster, PA, Oct. 7, 2002.

Nazarian, Birgit, "Robotic Grocery Stores Pop Up Nationwide"; Enterprise Efficiency, TechWeb, Apr. 5, 2012.

Tobe, Frank, "Everything-Robotic", The Robotic Report, Oct. 2, 2012.

Chaves, Jon et al., "Korger Debuts Kiosk Concept at Area College Campus", The Blade, Feb. 15, 2012.

Murray, Charles J., "Now There's a Robot", Design News, Mar. 26, 1990.

Anandan, Tanya, "The End of Sepration: Man and Robot as Collaboative Coworkers on the Factory Floor", Robotic Industries Association, Jun. 6, 2013.

* cited by examiner

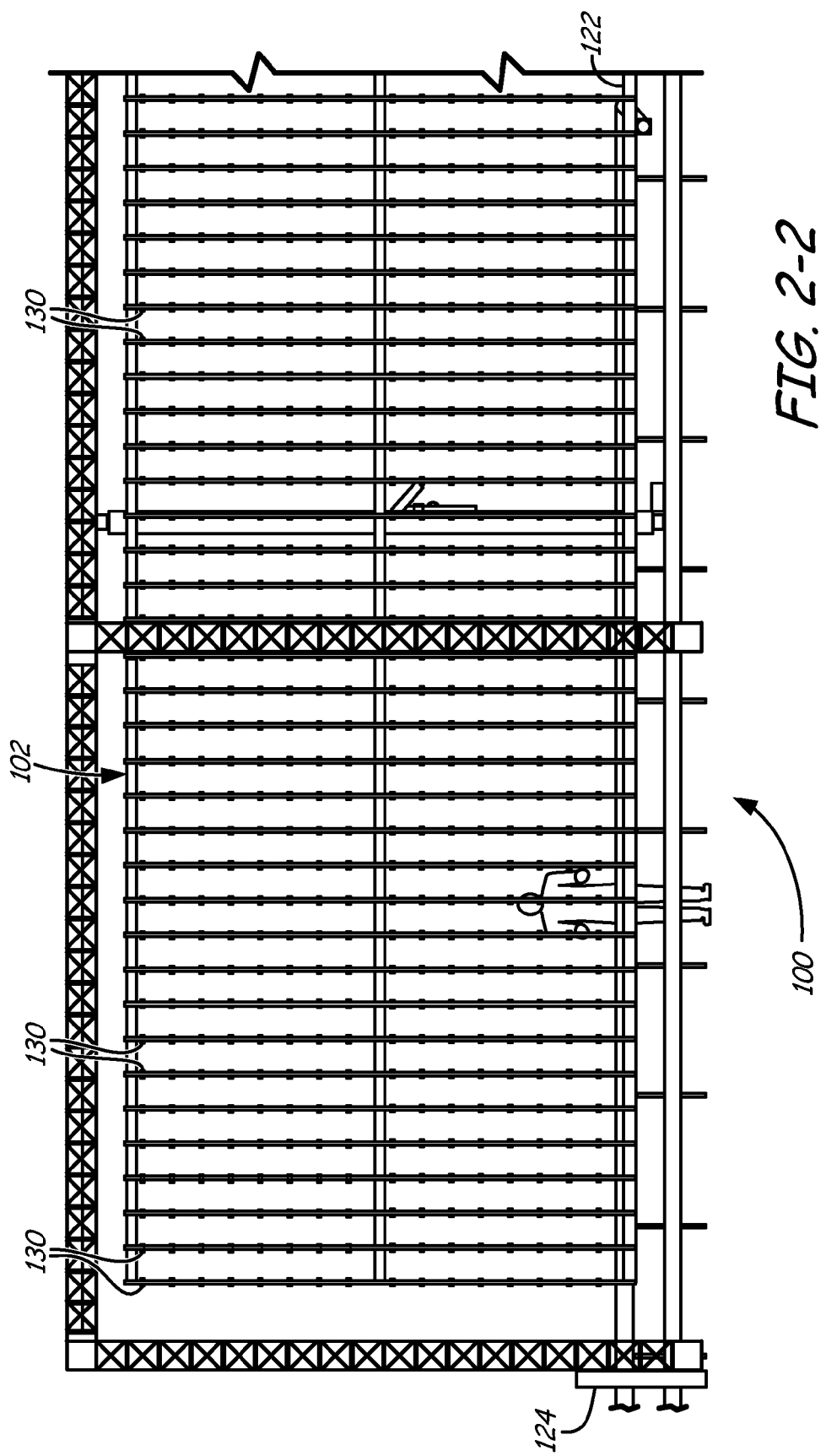

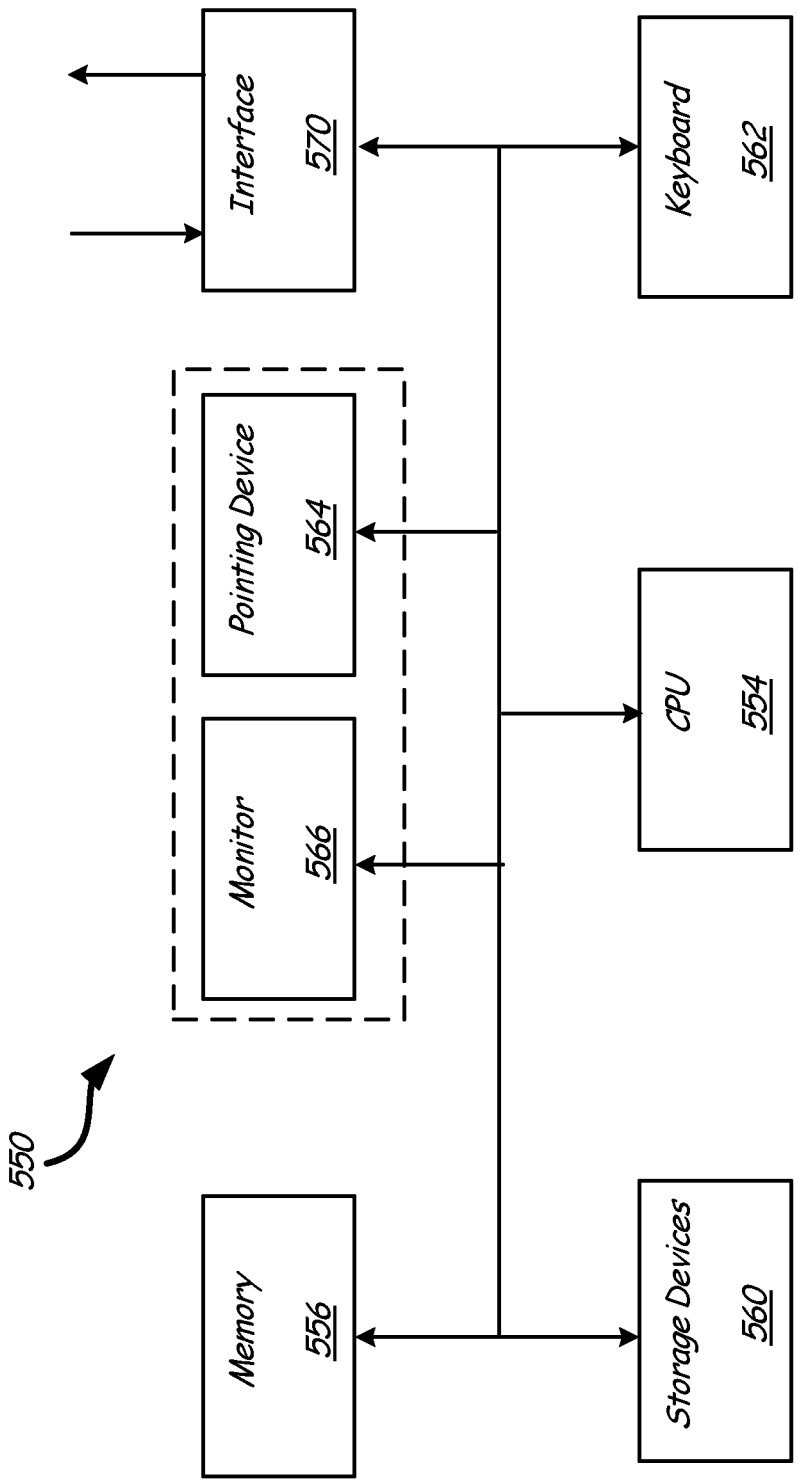

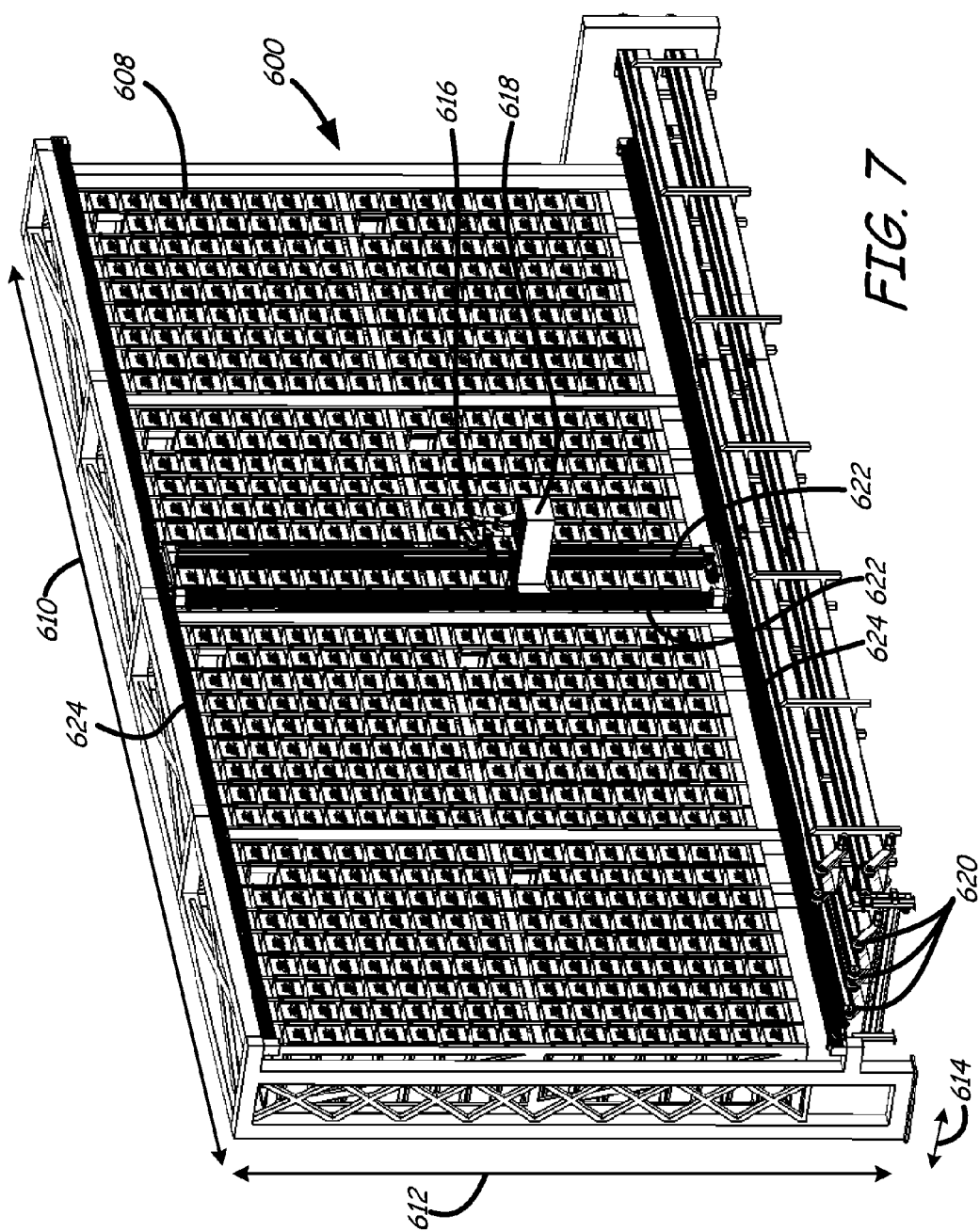

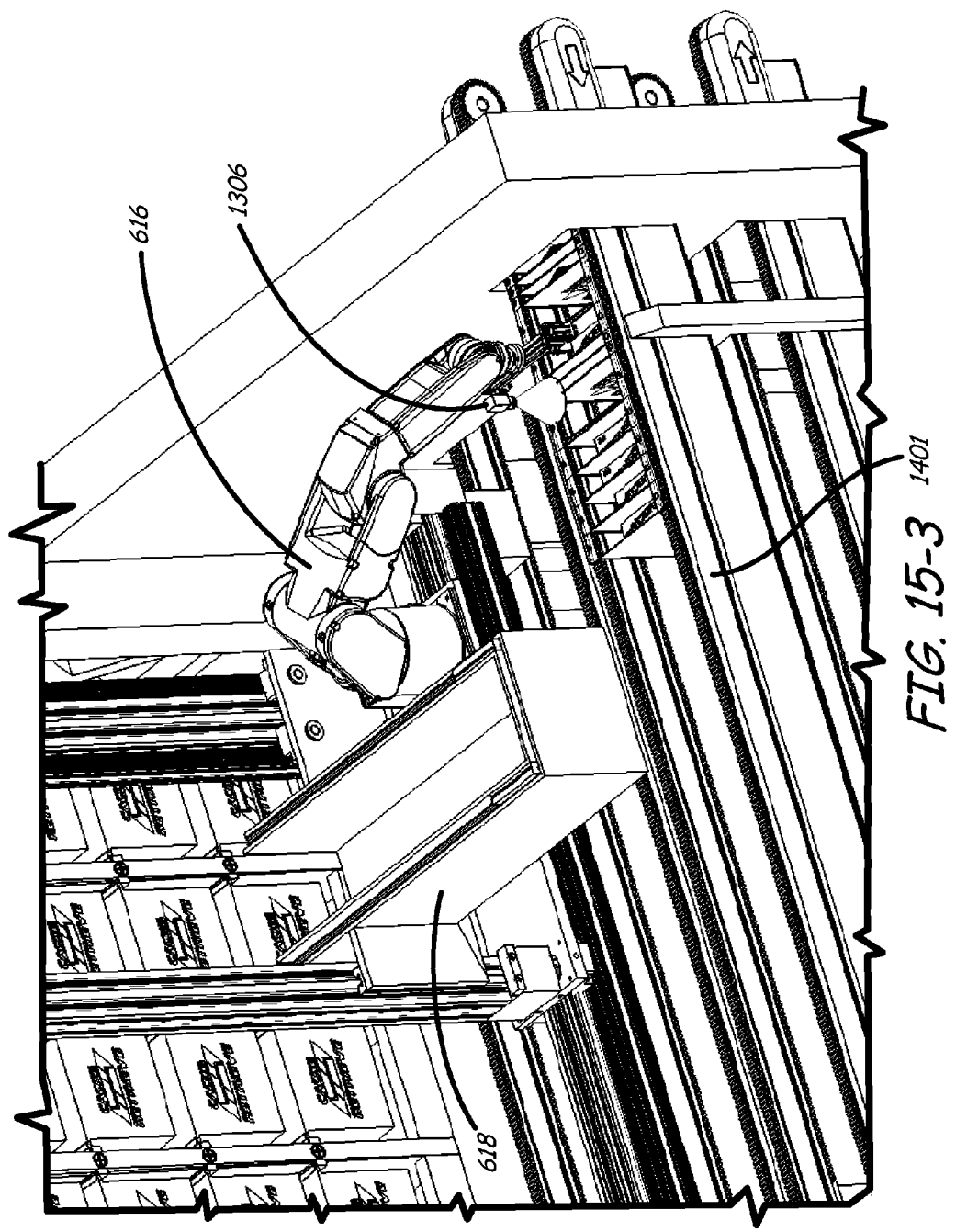

ROBOTIC STORAGE AND RETRIEVAL SYSTEMS

REFERENCE TO RELATED CASE

The present application is based on and claims the priority of provisional application Ser. No. 61/368,399 filed on Jul. 28, 2010, the content of which is hereby incorporated by reference in its entirety.

BACKGROUND

Electro-mechanical systems are commonly used to store and retrieve articles. One well-known example of such a system is a kiosk. Kiosks generally serve the purpose of selling articles such as snacks, beverages, and newspapers. Article selection is commonly performed by selecting an item using a user interface. For example, a user interface may include push buttons that enable a user to choose a desired article. Kiosks also commonly include a system for receiving payment for a selected article. Once an article is selected and the required payment has been received, the desired article is delivered to a dispensing area where the user may retrieve the article.

SUMMARY

An aspect of the disclosure relates to robotic storage and retrieval systems. In one embodiment, a robotic storage and retrieval system includes a three-dimensional storage rack, a set of article holders, and a robot. The storage rack has a plurality of rows, a plurality of columns, and one or more support members at each unique row and column position. Each set of article holders is located at one of the unique row and column positions, and each article holder within a set is vertically supported by the one or more support members. The robot is configured to store the article holders to the storage rack and to retrieve the article holders from the storage rack. Each article holder may optionally be associated with a unique identifier, and the robot may be configured to read the article holder identifiers such that the robot is able to selectively remove one of the article holders from the storage rack. The robot illustratively selectively removes the article holder utilizing a telescoping support member that is configured to remove a set of article holders form each unique row and column position of the storage rack. In an embodiment, the robot and the telescoping support member are carried by a single carriage that moves to different rack positions utilizing one or more rails. Additionally, the article holders may comprise different types of article holders, have visual identifiers, have different sizes, be transparent, and/or be opaque.

In another embodiment, a robotic storage and retrieval system includes one or more racks, a database, and a system controller. Each of the one or more racks is configured to store a plurality of article holders to a plurality of different rack positions. The database is configured to store information associating each of the plurality of different rack positions with one or more of the articles holders. The database is further configured to associate each of the article holders with an article. The system controller is configured to receive an indication of one of the articles and to identify the rack, the rack position, and the article holder associated with the article. The system controller may also be configured to provide data mining and querying capabilities for at least a portion of the articles utilizing internal and/or external data sources.

A robotic storage and retrieval system may optionally include a retrieval system and a dispensing station. The retrieval system is configured to remove article holders from the one or more racks, and the dispensing station is configured to deliver articles to a user. Additionally, the one or more racks may comprise two or more racks. In one embodiment having two or more racks, the retrieval system comprises one robot that is configured to remove article holders from each of the two or more racks. In another embodiment having two or more racks, the retrieval system comprises at least two robots, and each of the at least two robots is configured to remove article holders from one of the two or more racks. Robotic storage and retrieval systems may also include a user interface that receives an indication of an article. The user interface can be part of an outer housing of the system, or can be remote from an outer housing of the system.

In yet another embodiment, a robotic storage and retrieval system includes a three-dimensional storage rack, a user interface, a system controller, a retrieval system, and a dispensing station. The three-dimensional storage rack stores a plurality of articles in article holders. The user interface allows a user to select one of the plurality of articles. The system controller determines which one of the article holders includes the selected article. The retrieval system removes the article holder with the selected article from the rack, and the dispensing station delivers the selected article to the user. In one embodiment, the user interface may provide the user with additional information about one or more articles by utilizing searching or browsing capabilities of the system. Furthermore, article holders may optionally be transparent, different sizes, and/or include a gripping feature. Gripping features illustratively enable a robot to pick-up and handle the article holder. Gripping features may also include a vision system target and an identifier. The vision system target enables the robot to align to the article holder, and the identifier uniquely identifies the article holder.

Furthermore, in one embodiment, a method includes receiving an indication of an article identifier and receiving an indication of an article holder identifier. An article that is associated with the article identifier is placed in an article holder that is associated with the article holder identifier. The article holder is stored to a position in a rack, and an association between the article identifier, the article holder identifier, and the position in the rack is created in a database. The indication of the article identifier may be received by manually scanning the article identifier or by automatically scanning the article identifier. The indication of the article identifier may comprise an indication of a stock-keeping unit, and the indication of the article holder identifier may comprise a two-dimensional barcode. Additionally, the method can further comprise retrieving the article from the rack, dispensing the article to a user, and processing a payment for the article before dispensing the article.

These and various other features and advantages that characterize the claimed embodiments will become apparent upon reading the following detailed description and upon reviewing the associated drawings.

BRIEF DESCRIPTION OF THE DRAWINGS

FIG. 1-2 is a front view of a robotic storage and retrieval system that stores articles in folders.

FIG. 1-3 is a top view of a robotic storage and retrieval system that stores articles in folders.

FIG. 1-4 is a side view of a robotic storage and retrieval system that stores articles in folders.

FIG. 2-1 is a perspective view of a robotic storage and retrieval system with an outer housing removed.

FIG. 2-2 is a front view of a robotic storage and retrieval system with an outer housing removed.

FIG. 3 is a front view of files being stored to a rack.

FIGS. 4-1, 4-2, and 4-3 illustrate steps associated with a robot storing files to and retrieving articles from a rack.

FIG. 5 is a block diagram of a system controller that may be used in a robotic storage and retrieval system.

FIG. 7 is a perspective view of a robotic storage and retrieval system that stores articles in bins with an outer housing removed.

FIGS. 13-1, 13-2, 13-3, 13-4, 13-5, 13-6, and 13-7 illustrate steps associated with a robot retrieving a bin from a rack.

FIGS. 14-1 and 14-2 are perspective views of a conveyor system for unloading and sorting empty bins.

FIGS. 15-1, 15-2, 15-3, and 15-4 illustrate steps associated with storing bins to a rack.

FIG. 15-5 is a top down schematic diagram of an article handling robot and shuttle.

FIG. 15-6 is a top down schematic diagram of an article holder clamping device.

FIG. 15-7 is a top down schematic diagram of an article holder hook device.

DETAILED DESCRIPTION

Embodiments of the present disclosure are directed to robotic storage and retrieval systems. The systems may be used in applications such as, but not limited to, dispensing an article (e.g. a product) to a user. For example, in an embodiment, a system may have a user interface that allows for a user to query, review, and select an article. The article is then retrieved and dispensed to the user. Embodiments of the present disclosure are not however limited to any particular application and may be used in other settings.

In one particular implementation, a robotic storage and retrieval system includes a three-dimensional storage rack. The rack has a plurality of rows and columns. At each unique row and column position, the rack has a set of article holders. Each set of article holders has one or more article holders, and each article holder optionally includes an article included within it. The system is illustratively able to selectively retrieve and dispense any one of the articles included anywhere within the three-dimensional storage rack.

Figure 1:
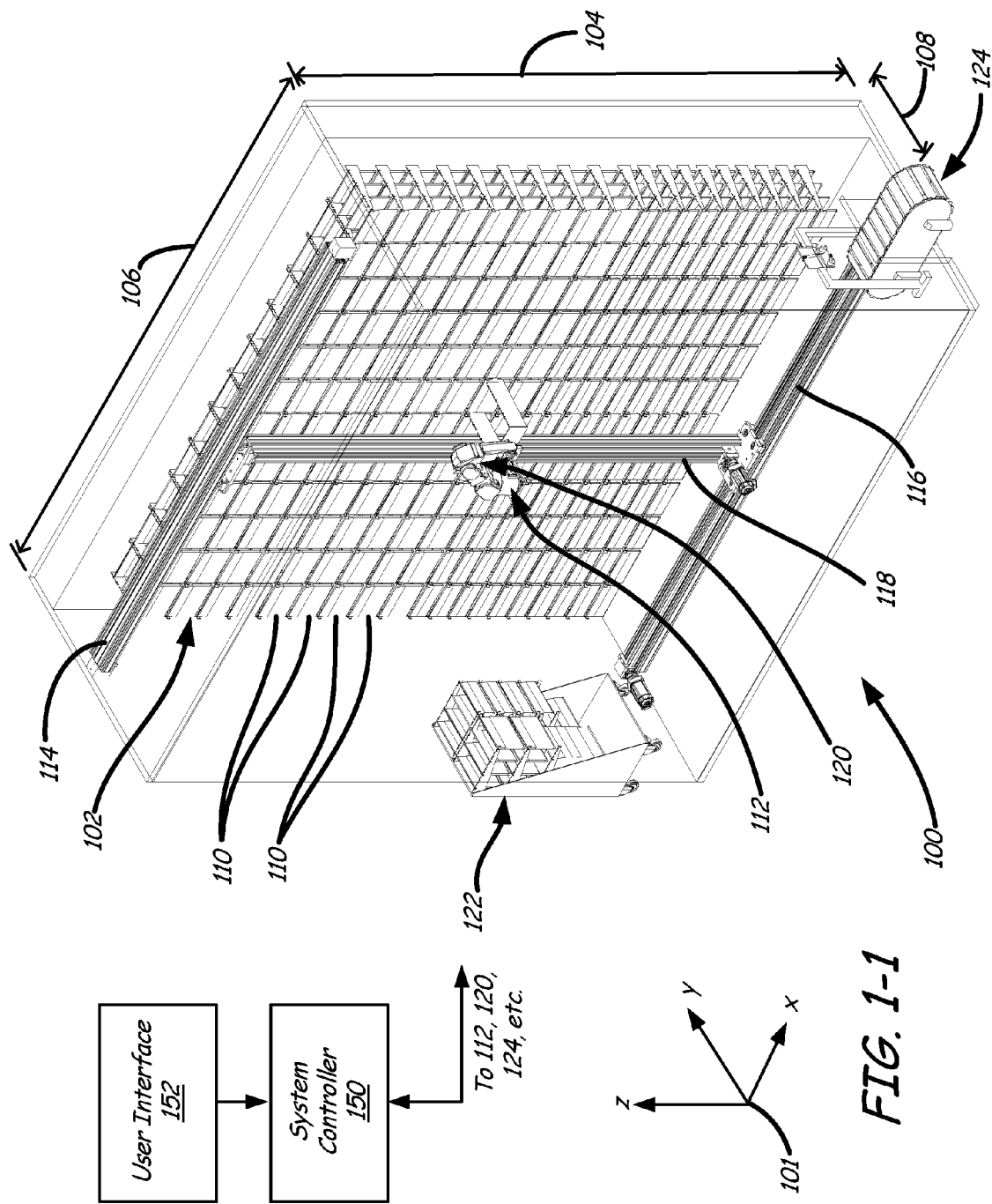
FIG. 1-1 is a perspective view of a robotic storage and retrieval system that stores articles in folders.

FIG. 1-1 is a perspective view of one embodiment of a robotic storage and retrieval system 100. System 100 includes a three-dimensional storage rack 102 that has a height 104, a width 106, and a depth 108. The particular example of a rack 102 shown in FIG. 1-1 has twelve columns of sets 110 of article holders along the width 106 of the rack 102, and nineteen rows of sets 110 of article holders along the height 104 of the rack 102. Embodiments are not however limited to any particular number of rows and/or columns, and embodiments illustratively include any number of rows and/or columns. Also, as will be explained in greater detail below, each set 110 optionally includes any number of article holders (e.g. 0, 1, 2, 3, 4, etc.) and may include different types of article holders (e.g. both files and bins).

In an embodiment, each article holder stores an article. For instance, one or more article holders within system 100 may include a product such as, but not limited to, a compact disc, a digital versatile disc, a CD-ROM, an electrical cable/cord, a book, a video game disc, batteries, small commodities, etc.

System 100 also includes a robot 112. Robot 112 is configured such that it is able to store and/or retrieve article holders, and hence articles, to and from rack 102. In the embodiment shown in the figure, robot 112 moves along the width 106 of rack 102 utilizing a top rail 114 and a bottom rail 116. Robot 112 moves along the height 104 of rack 102 utilizing a vertical rail 118. The horizontal top 114 and bottom 116 rails are stationary, while the vertical rail 118 is movable along the top 114 and bottom 116 rails. Movement of the vertical rail 118 on top and bottom rails 114 and 116 can be accomplished through well known drive assembly devices such as, but not limited to, actuators (e.g. hydraulic, pneumatic, or electric), electric linear motors, conveyor mechanisms, ball screw actuators, or pinion gears driven on racks provided on rails 114, 116. Movement of the robot 112 on rail 118 can be accomplished for example with any of the afore-mentioned devices or similar devices.

Robot 112 further optionally includes an arm 120. Arm 120 is a multi-axes arm such as, but not limited to, a two to six axes arm. In one embodiment, arm 120 is configured to pick-up article holders from a loading station 122, and then store the article holders to the three-dimensional storage rack 102. Arm 120 may further be configured to retrieve article holders from storage rack 102, and then drop-off the contents of the article holders at a dispensing station 124.

System 100 also optionally includes a user interface 152. User interface 152 may be implemented as a computer such as, but not limited to, a computer with a display and a keyboard and/or mouse, or a computer with a touch-screen display. A user illustratively utilizes the user interface 152 to query and review articles (e.g. products) that are available, and to select an article that is stored in rack 102. The user may also optionally utilize the user interface to pay for the article (e.g. by using cash or a credit card). The article is then retrieved by robot 102 and is dispensed to the user at dispensing station 124.

User interface 152 is illustratively communicatively coupled to a system controller 150. In an embodiment, system controller 150 controls the operations of system 100. For instance, system controller 150 sends signals to components of the system such as, but not limited to, robot 112, robot arm 120, conveyor 124, etc. System controller 150 is not limited to any particular implementation. One example of a system controller 150 that could be used is described below and shown in FIG. 5.

Figures 1, 2:
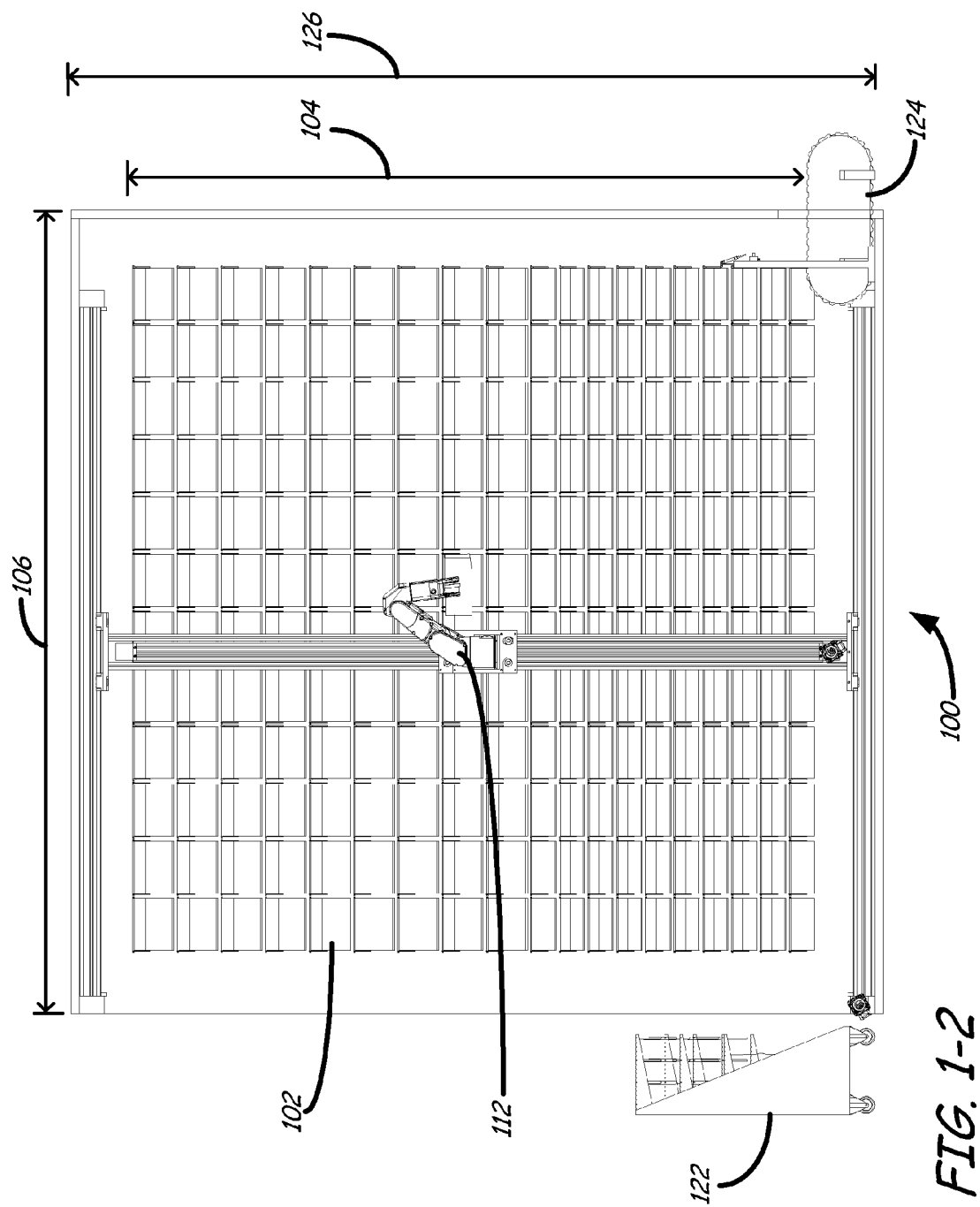

FIG. 1-2 is front view of storage and retrieval system 100. From the perspective shown in the figure, the loading station 122 is shown as being on the left hand side of the rack 102 and the dispensing station 124 is shown as being on the right hand side of the rack 102. Embodiments are not however limited to any particular orientation/configuration. Loading stations 122 and dispensing stations 124 are optionally placed at any position relative to the rack 102.

As was previously mentioned, embodiments include any number of sets of article holders along the width 106 and height 104 of rack 102. Embodiments similarly include any dimensions (e.g. any combination of height, width, and depth). In one example, for illustration purposes only and not by limitation, a system 100 includes thirty-six columns and sixteen rows resulting in five hundred and seventy-six sets. The rack 102 has a width 106 of forty feet, a height 104 of sixteen feet, and an overall height 126 of the system is illustratively twenty feet tall. Embodiments are not however limited to any particular dimensions and can include any dimensions that may be needed or desired for a particular implementation or setting.

Figures 1, 2, 3:
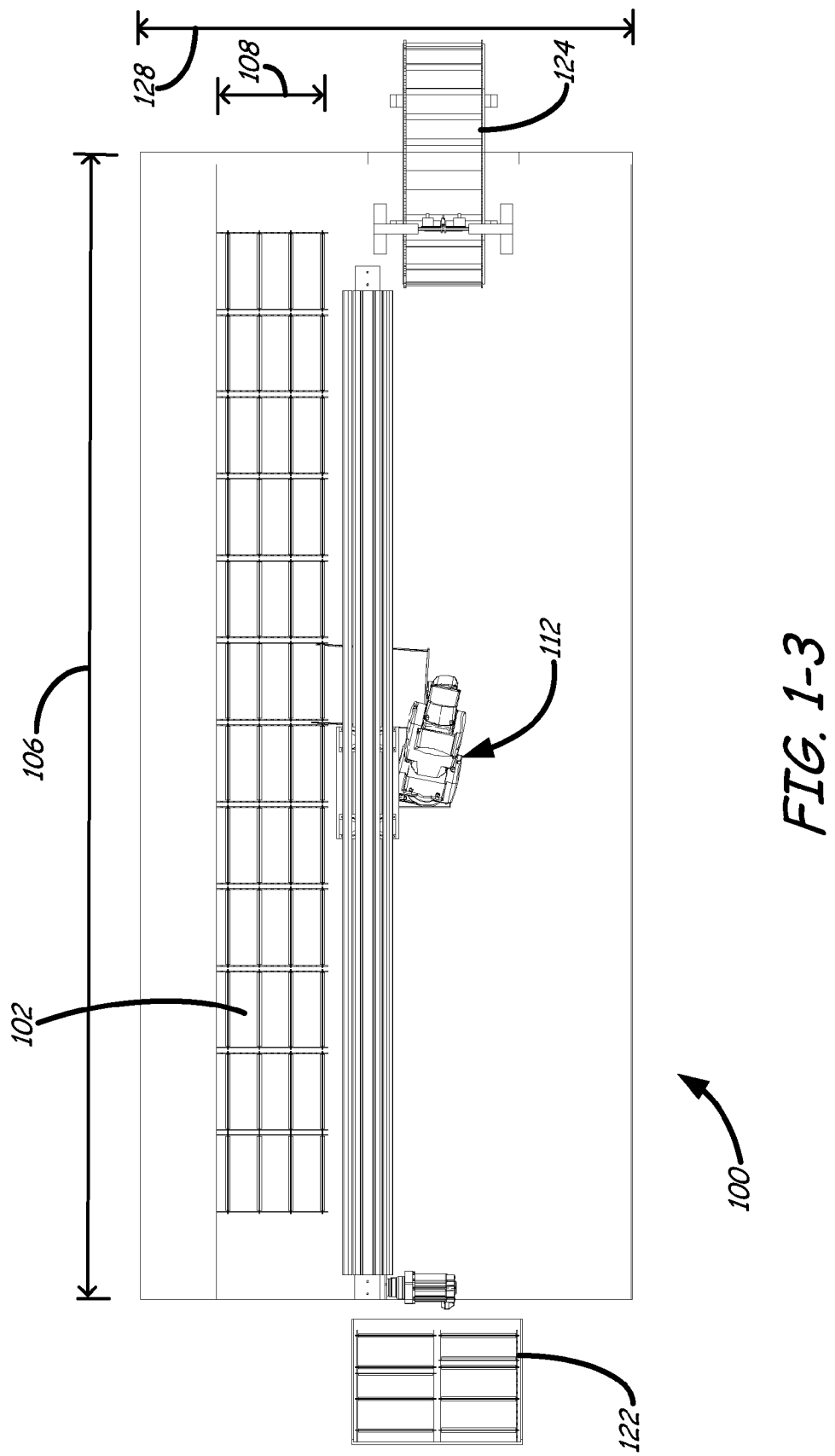

FIG. 1-3 is a top down view of storage and retrieval system 100. The figure shows that rack 102 has a depth 108 and that system 100 has an overall depth 128. In one exemplary embodiment, depth 108 is thirty-six inches. Depth 108 is configurable such that embodiments are able to hold any amount of articles. Again, as was previously mentioned, embodiments are not limited to any particular dimensions/configurations and may for instance be larger or smaller than the described embodiments.

FIG. 1-4 is a side view of system 100 from the right hand side or dispensing side 124. The figure shows that system 100 includes a number of rails or support members 130 that support the article holders. FIG. 1-4 shows a system with nineteen support members 130 along the height 104 of the rack 102. Embodiments may of course have more or less than the illustrated nineteen.

FIG. 2-1 is a perspective view of a storage and retrieval system 100 with the outer casing (shown in FIG. 1-1) having been removed and the rack 102 being empty (i.e. the rack not having any article holders stored therein). It is worth noting that the outer casing of system 100 may be completely opaque, completely translucent, or a combination of opaque and translucent. Accordingly, a user may or may not be able to see within system 100. System 100 may also include signage (e.g. digital and/or fixed) incorporated within its outer casing or attached to its outer casing. For instance, system 100 could include signage that indicates what types of articles may be retrieved from the system and/or a particular retailer associated with the system.

FIG. 2-2 is a back view of the system 100 shown in FIG. 2-1. FIG. 2-1 shows that each set of article holders within the rack 102 is supported by one or more support members 130, which is supported in return by one or more posts 132. In this embodiment, each pair of support members 130 has corresponding notches or grooves that are aligned and support the article holders. In one embodiment, an article holder (e.g. a file or bin) is supported by a total of two notches/grooves. In another embodiment, an article holder is supported by more than two notches/grooves (e.g. four notches/grooves). This configurability allows for flexibility in article holder construction and size. For instance, an article holder that is supported by four notches/grooves may be able to support a larger article than an article holder that is only supported by two notches/grooves. Additionally, one system 100 may utilize a combination of configurations such that article holders within the system may be supported by different numbers of notches/grooves.

FIG. 3 is a front view of two sets of article holders 110. The figure shows that each article holder is vertically supported by one or more support members 130, and that the support members 130 are optionally supported by one or more posts 132. Each set 110 has an outer perimeter or surface 111. The outer perimeter 111 optionally has empty space around it such that a robot arm is able to lift the sets 110. In the bottom set 110 in the figure, the empty space around the set that is needed for robot access is indicated by line 134. The support members 130 can be disposed on posts 132 as needed. Likewise, the posts 132 can be disposed relative to each other as needed.

Each set of article holders illustratively has a height of ten inches, a width of ten inches, and a depth of thirty-six inches. Each article holder (e.g. folder or bin) within a set illustratively has a height of ten inches, a width of ten inches, and a variable depth. The variable depth is for example between one to three inches. Embodiments again are not however limited to any particular dimensions. Additionally, each article holder may be clear such that the contents of the article holder can be seen by a user, or each article holder may be opaque/colored or have graphics or signage that may obstruct or partially obstruct a user's view of the contents of an article holder. In one embodiment, as is described below in greater detail, article holders are transparent or translucent such that an automated or semi-automated article identifier (e.g. a barcode scanner or RFID reader) is able to identify the article within the holder.

In another embodiment, a storage and retrieval system has different size article holders such that article holders within a system have different heights, widths, and/or depths. For instance, in the embodiment shown in FIGS. 1-1, 1-2, and 1-4, the article holders in the lower portion of the rack 102 have shorter heights than the article holders in the upper portion of the rack 102. This results in a greater density of article holders in the lower portion. Furthermore, the rails 130 and/or posts 132 (labeled in FIG. 3) within a rack are optionally reconfigurable (e.g. movable) manually or automatically by the system robot. For instance, the robot 112 can be outfitted with a tool to hold, move, and relocate the support members 130 as desired and/or move the posts 132 as desired. This allows for one system to accommodate different size article holders without manual intervention by a user. A user for instance does not need to open up the system and manually reconfigure the support members and/or posts. Additionally, a storage and retrieval system may include a mixture of different types of articles holders (e.g. folders, bins, etc.), and the rack is configured as necessary to support the different types of article holders.

Figures 1, 2, 3, 4:
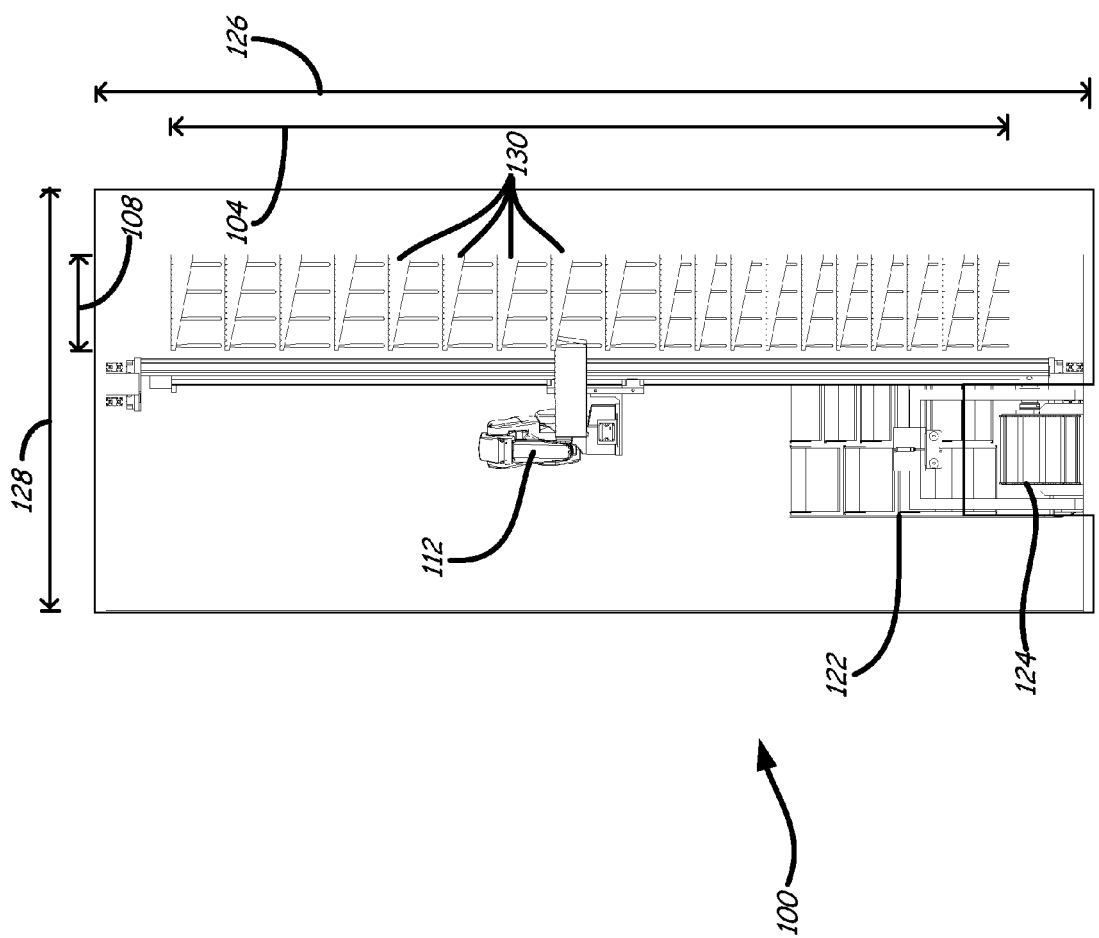
Figures 1, 2:
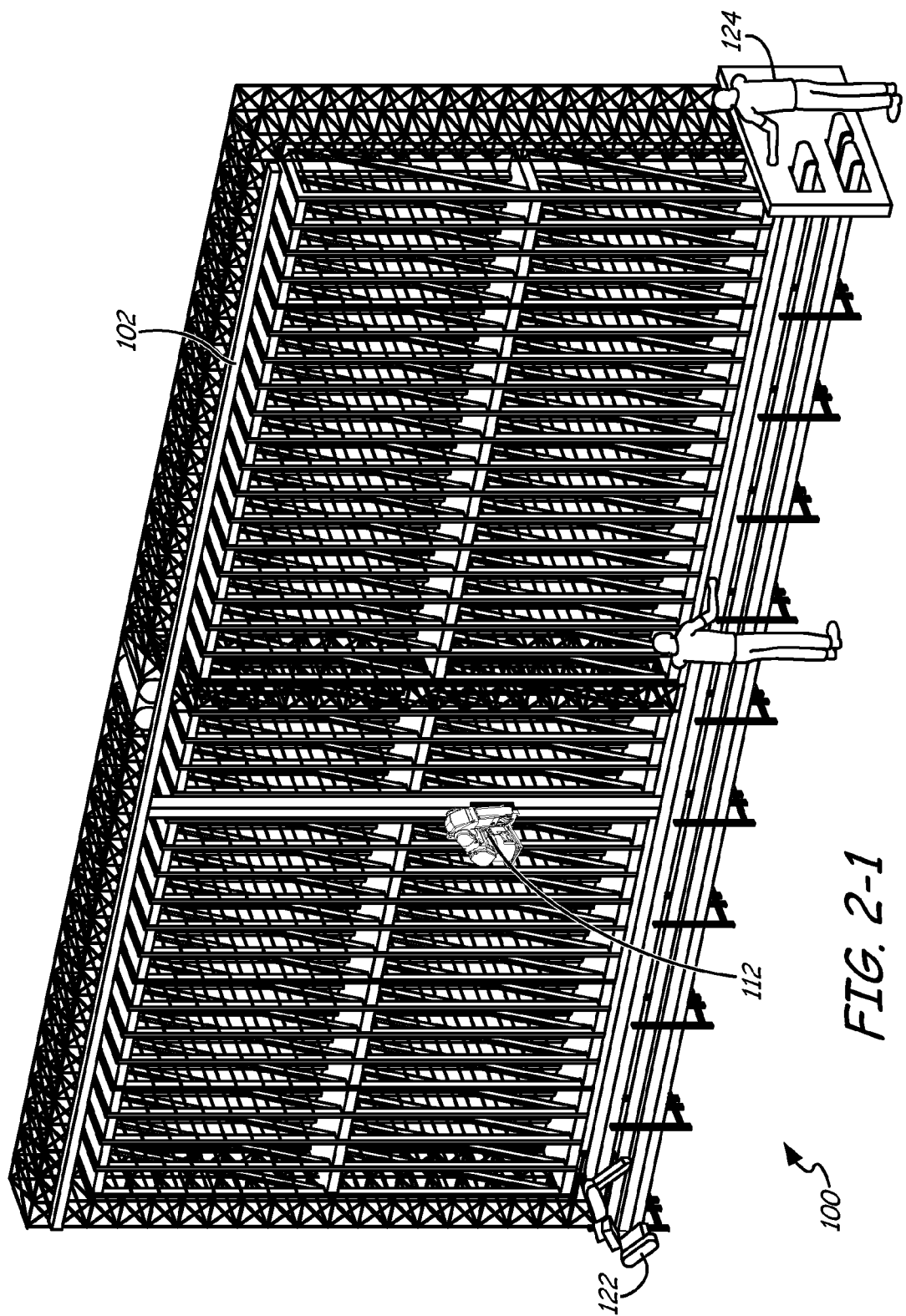
Figure 3:
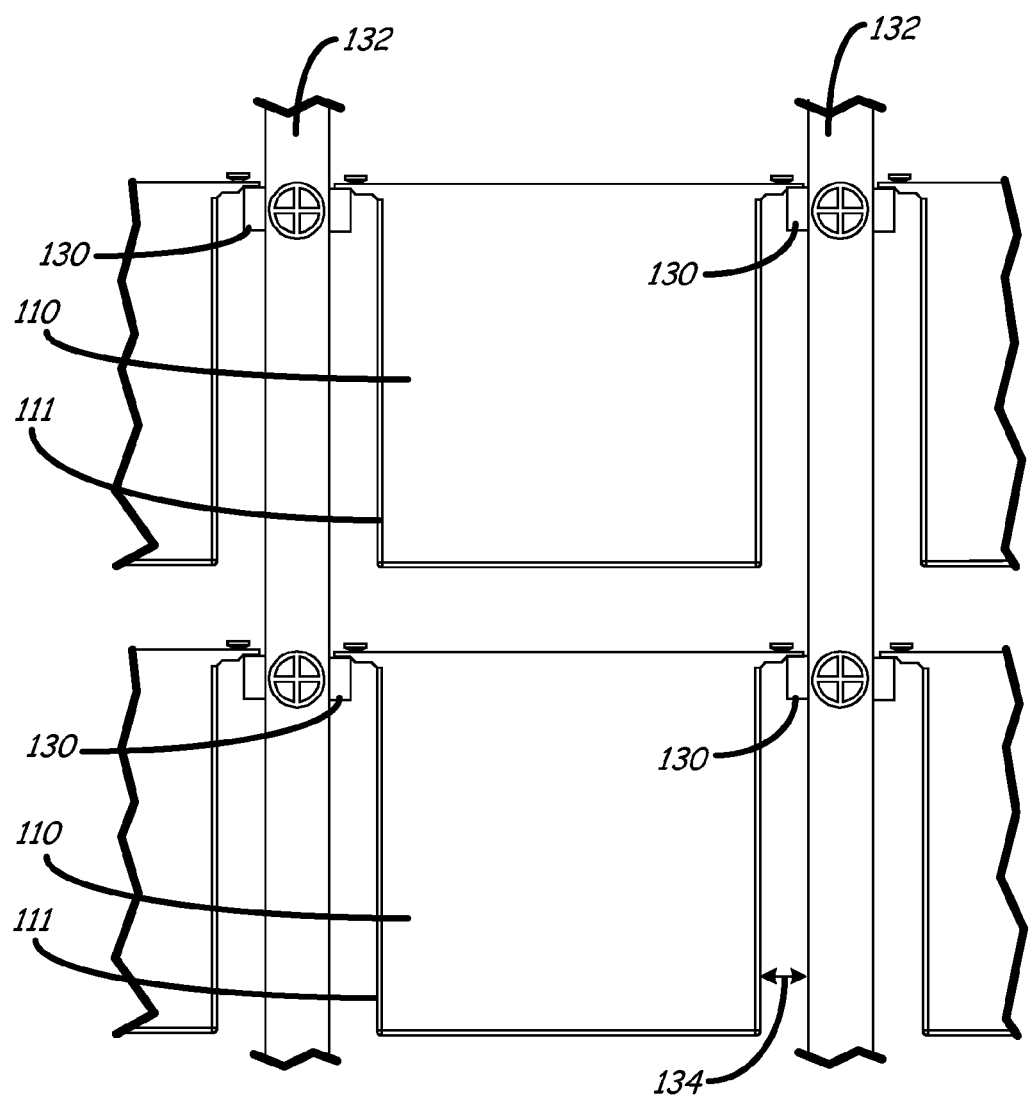
Figures 1, 4:
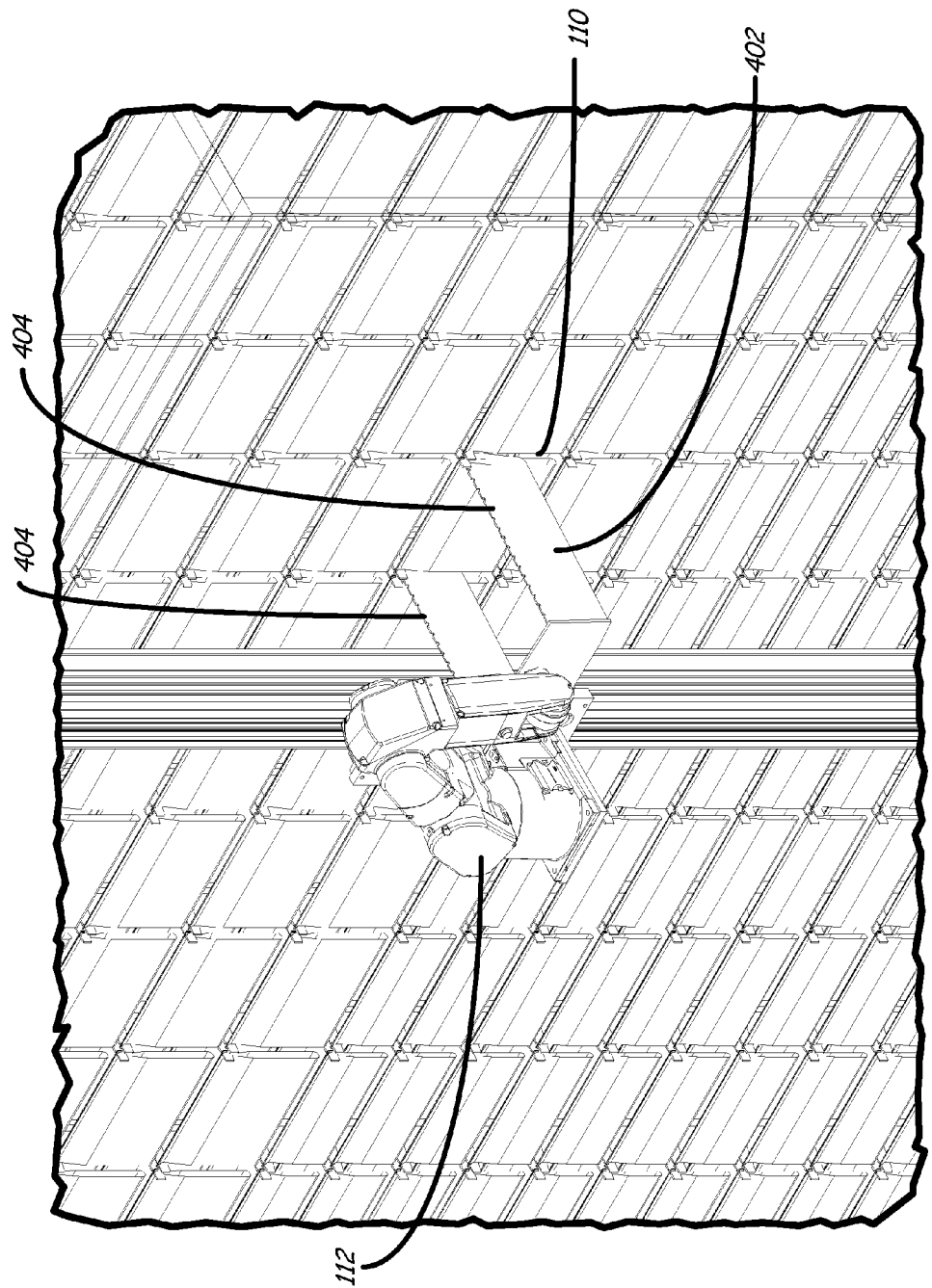
Figures 2, 4:
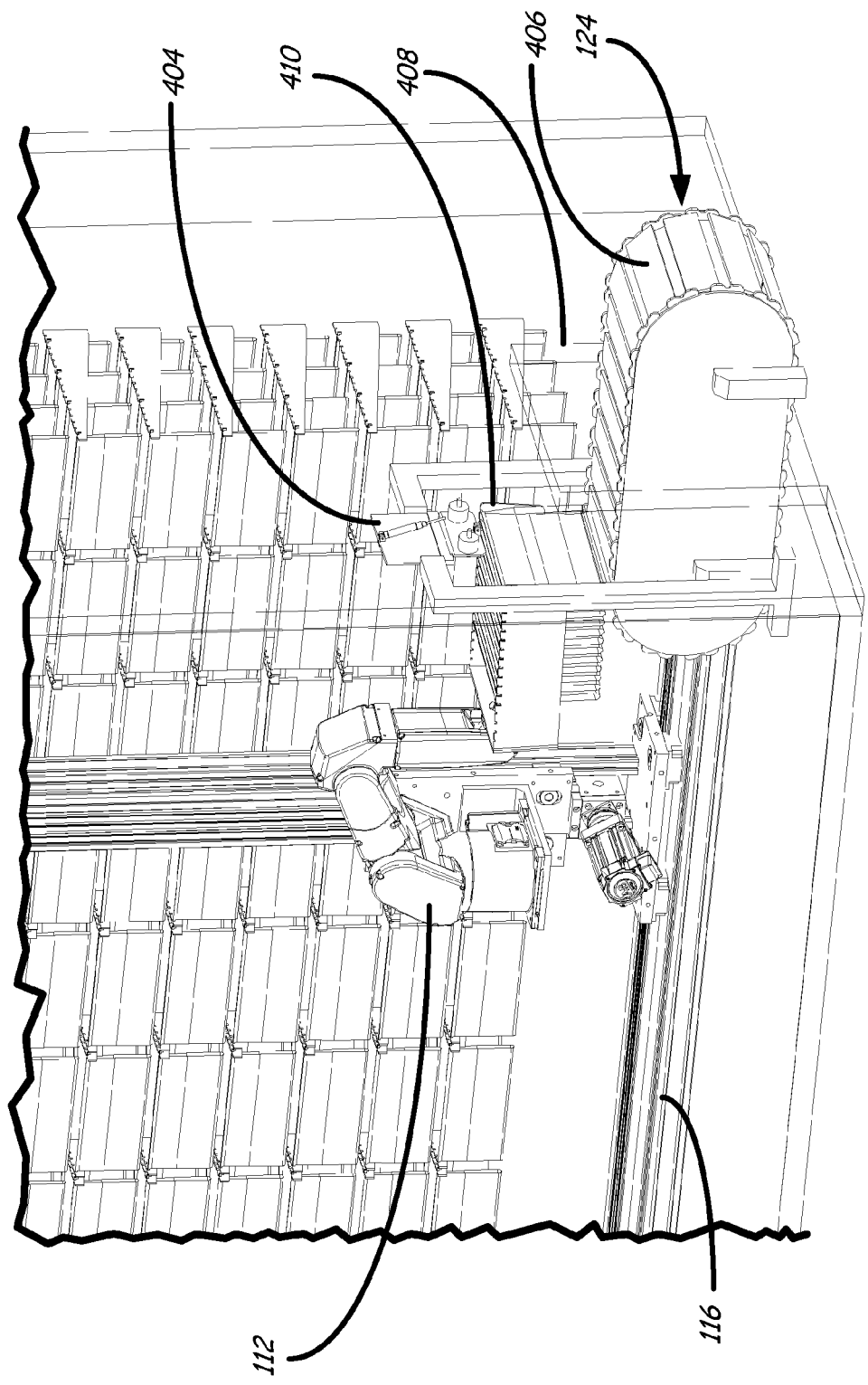
Figures 3, 4:
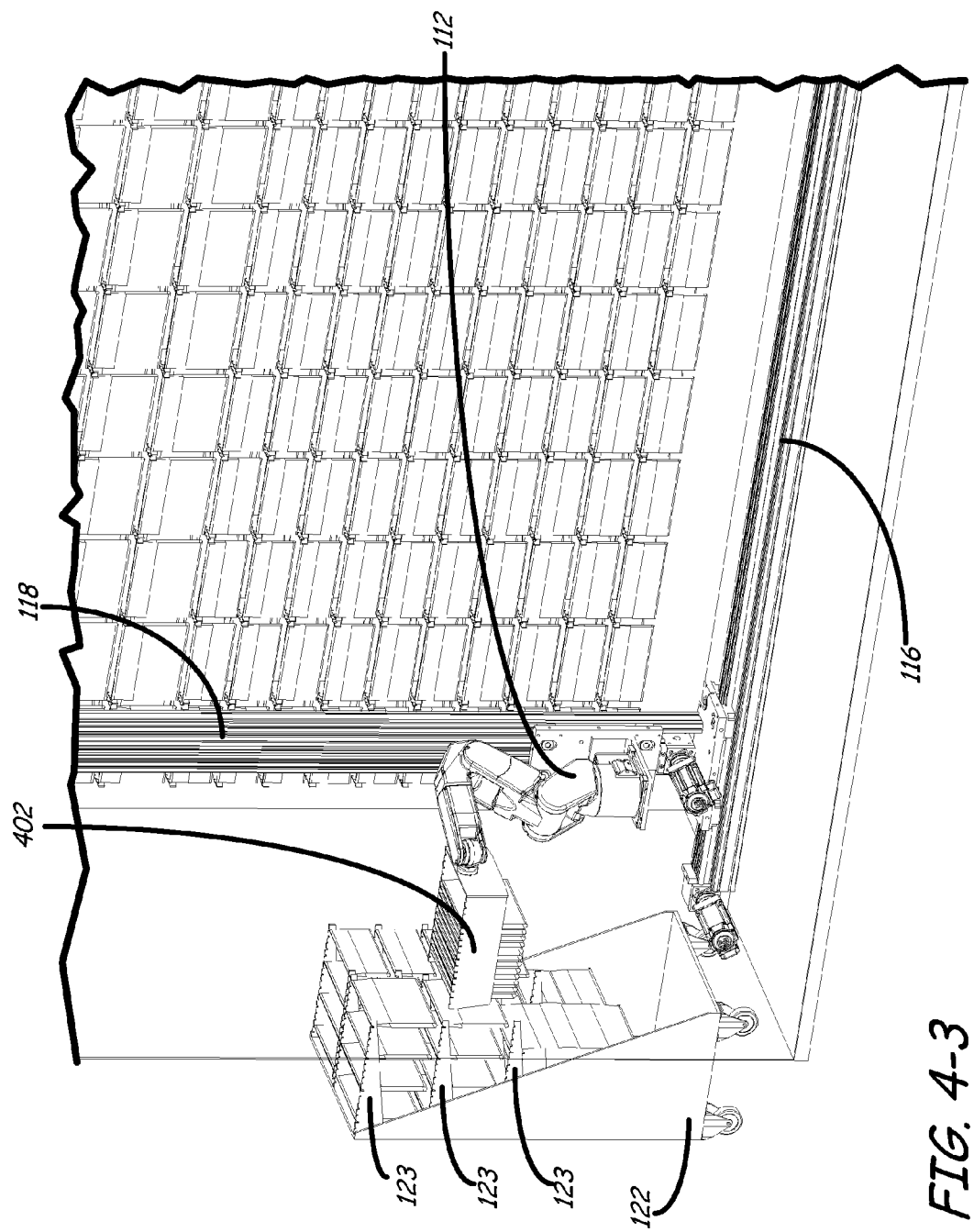

FIGS. 4-1, 4-2, and 4-3 illustrate the retrieval of an article from a robotic storage and retrieval system. A user first selects an article for retrieval. This could for instance be accomplished through a user interface attached to the system, through a remotely connected system, or through any other method. For example, a user could browse and select articles utilizing an internet/web-based system that communicates the article selection to the robotic storage and retrieval system. The robotic storage and retrieval system includes a database stored in memory having information about the articles within the system. As will be described in greater detail below, each article holder has an identifier such as an RFID tag or a barcode (e.g. a linear or two-dimensional barcode). Each article within an article holder also has a barcode or other identifier (e.g. an RFID tag or a stock-keeping unit "SKU"). The system database associates each article holder with an article and also with a location within the system's rack. The system for instance knows the row, column, and position within a set where each article holder is located. Accordingly, once a user has selected an article, as is shown in FIG. 4-1, robot 112 moves to the appropriate set of article holders 110 to retrieve the article based on information in the database.

FIG. 4-1 also shows that robot 112 includes an End of Arm Tool ("EOAT") 402 at the end of the robot arm. In this embodiment, End of Arm Tool 402 has a series of notches or grooves 404 along the tops of the opposing sides of the tool. These notches/grooves 404 correspond to (i.e. match-up with or are aligned to) the notches/grooves in rails 130 (labeled in FIG. 1-4).

Once End of Arm Tool 402 has moved to the correct set of article holders, End of Arm Tool 402 is inserted into the rack to engage the set such as alongside the article holders. In one embodiment, the End of Arm Tool 402 is inserted to a depth within the set such that desired article holder (i.e. the article holder with the user selected article) is at the end/last position of the End of Arm Tool 402. Once the End of Arm Tool 402 is at the appropriate depth within the rack to pick-up the selected article, robot 112 lifts the End of Arm Tool 402 and the article holders 410 up and out of the rack. Robot 112 then rotates End of Arm Tool 402 towards dispensing station 124 (shown and labeled in FIG. 1-1) and, robot 112 moves towards the dispensing station 124 along rails 116 and 118 (also shown and labeled in FIG. 1-1).

FIG. 4-2 shows robot 112 once it has brought the article holder with the selected article to the drop-off location of the dispensing station 124. In the specific embodiment shown in the figure, dispensing station 124 includes a suction/vacuum based article holder opener 404, a conveyor belt 406, and an opening/aperture 408 within the system's outer housing. Embodiments of the present disclosure are not however limited to any particular configuration or type of dispensing station 124.

In one embodiment, the suction/vacuum cups of opener 404 are rotated down such that they contact the outer surface of the article holder 410. After the opener 404 is in contact with the article holder 410, the opener moves the attached side of the article holder up and away to open the article holder and empty the article from the holder onto conveyor belt 406. The conveyor belt 406 is then able to rotate and move the article into a position where the user can easily retrieve the article. Once the desired article is dispensed to the user, robot 112 moves away from the dispensing station 124 along rails 116 and 118 towards the loading station 122 (shown in FIG. 1-1).

FIG. 4-3 shows robot 112 once it has moved along rails 116 and 118 to position the empty article holder within loading station 122. In one embodiment, robot 112 unloads the empty article holder by first inserting End of Arm Tool 402 into the loading station 122. Robot 112 then lowers End of Arm Tool 402 such that the empty article holder is positioned onto one of the support arms 123 of loading station 122. Once the empty article holder is positioned within loading station 122, robot 112 moves away from loading station 122 utilizing rails 116 and 118. It should be noted that robot 112 and its End of Arm Tool 402 may still be carrying other article holders. This would be the case for instance when the desired article was not in the outer most article holder within a set of article holders. In such a case, robot 112 then returns those other article holders to the set. They may be positioned within the same position as from which they were taken, or they may optionally be placed in a different location. Either way, the system's database is updated such that it knows which articles are included within the rack and their respective locations. In one embodiment, the article holders are returned to the rack such that they are in the furthest back location possible within a set (i.e. they are positioned such that any remaining open positions in the set are closest to the robot 112). This may allow for instance for easier reloading/restocking of the rack with articles since the article holders for the restock articles are placed at the front of each set.

In addition to utilizing loading station 122 to store empty article holders, loading station 122 may also be utilized in loading (e.g. stocking or re-stocking) articles to the rack. In one embodiment, a user scans a barcode or other identifying marker of an article, places the article in an article holder, scans the identifier of the article holder, and then places the article holder in loading station 122. The user optionally repeats this sequence until the loading station 122 is full, or until all of the articles desired to be stored are in the loading station 122. The system's database is then updated to include information that associates each article holder with the article included within the article holder.

In an embodiment, once the user wishes to have the system load the articles, the user moves the loading station 122 into a loading position. The system optionally has a sensor or other mechanism such that it is able to sense that article holders within the loading station 122 are ready to be stored. Robot 112 then positions the End of Arm Tool 402 in front of the loading station 122. The End of Arm Tool 402, robot 112, or some other attached device illustratively has a reader that is able to scan and read the identifiers (e.g. barcodes or RFID tags) on the article holders. For each article holder within station 122, the system reads the barcode, and then stores the article holder within the rack. The system updates its database to include the location where each article holder is placed. In one embodiment, robot 112 loads and stores one article holder at a time. Robot 112 may however in other embodiments load and store more than one article holder at a time.

Figures 1, 13:
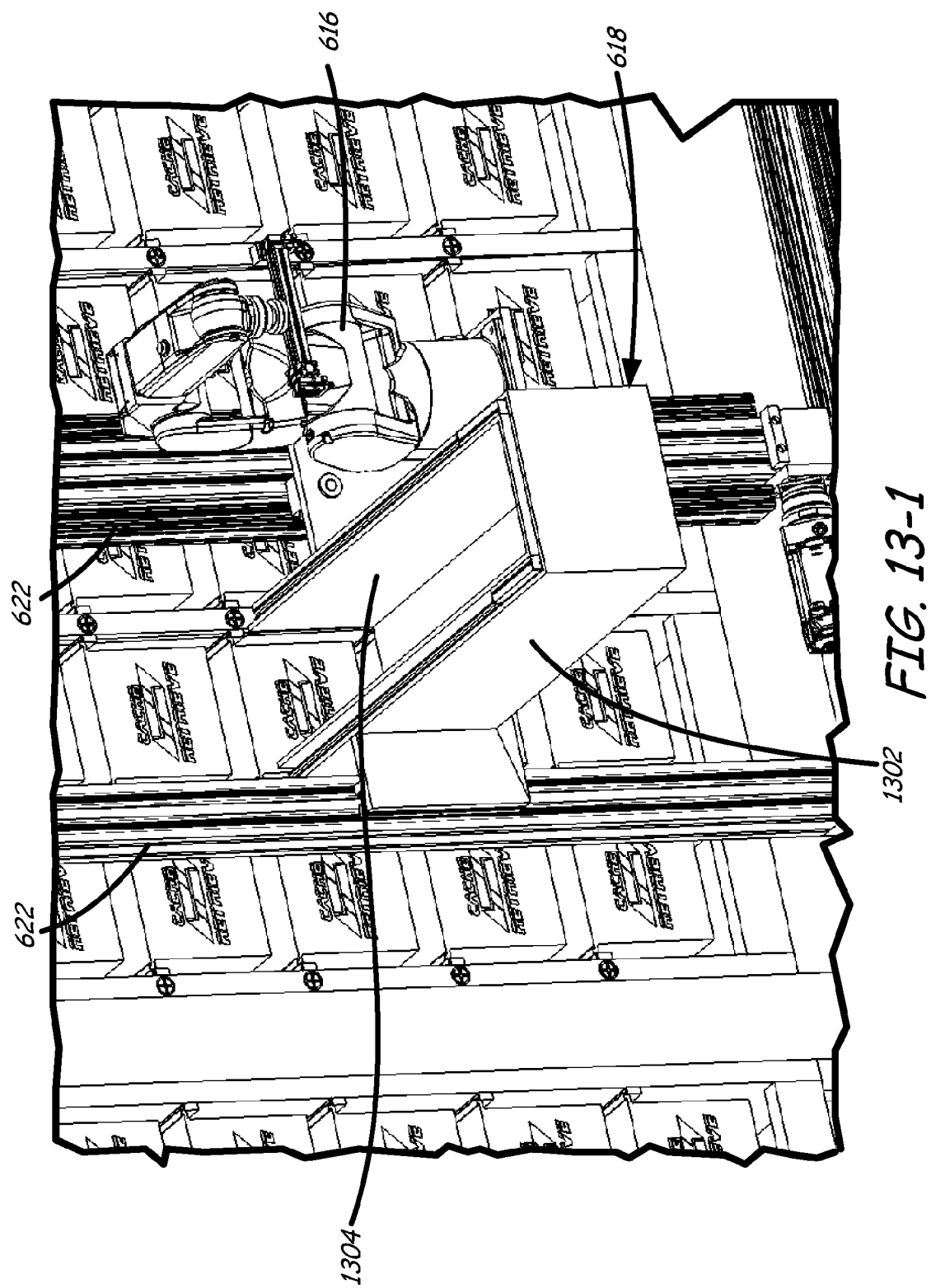
Figures 2, 13:
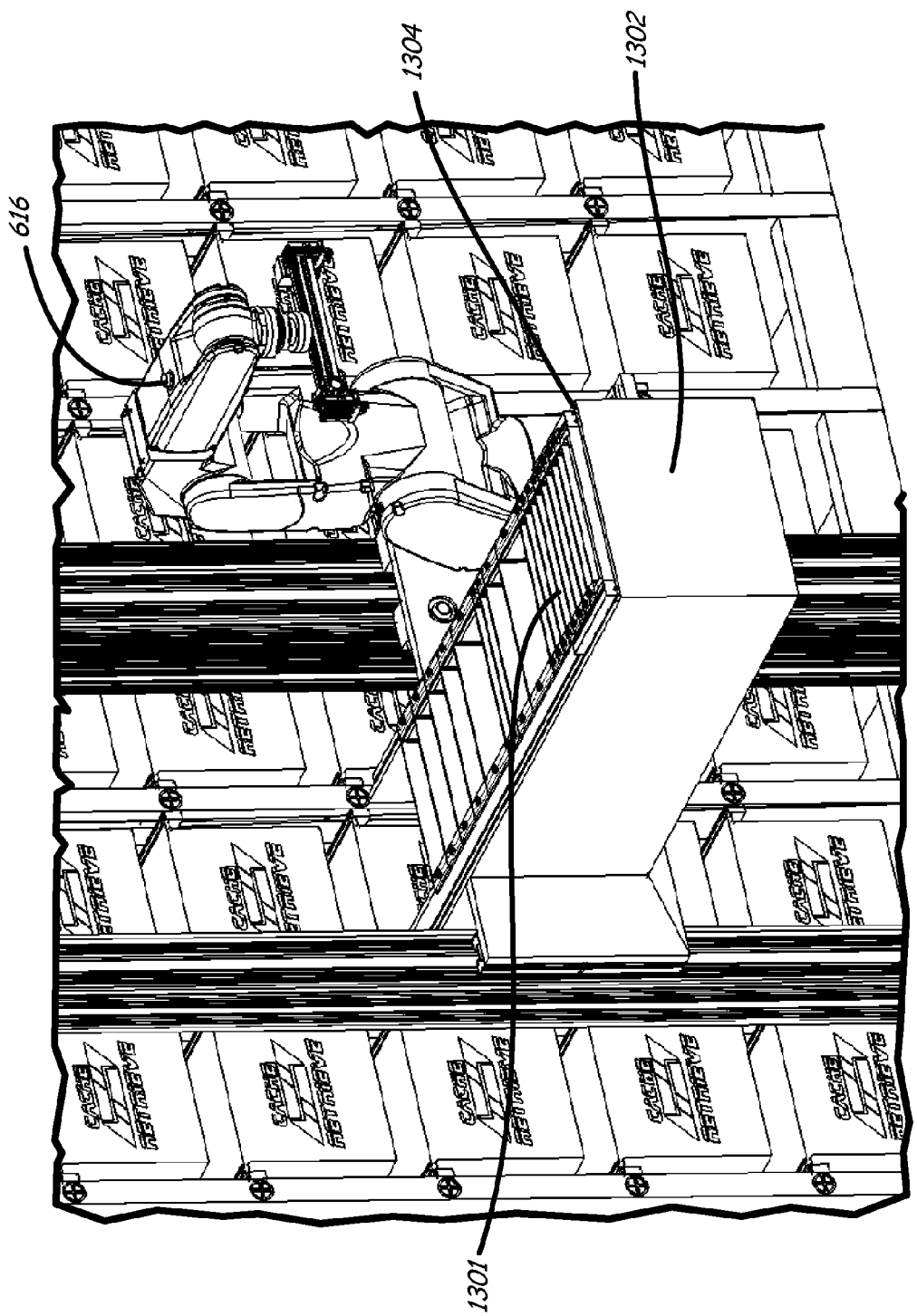
Figures 3, 13:
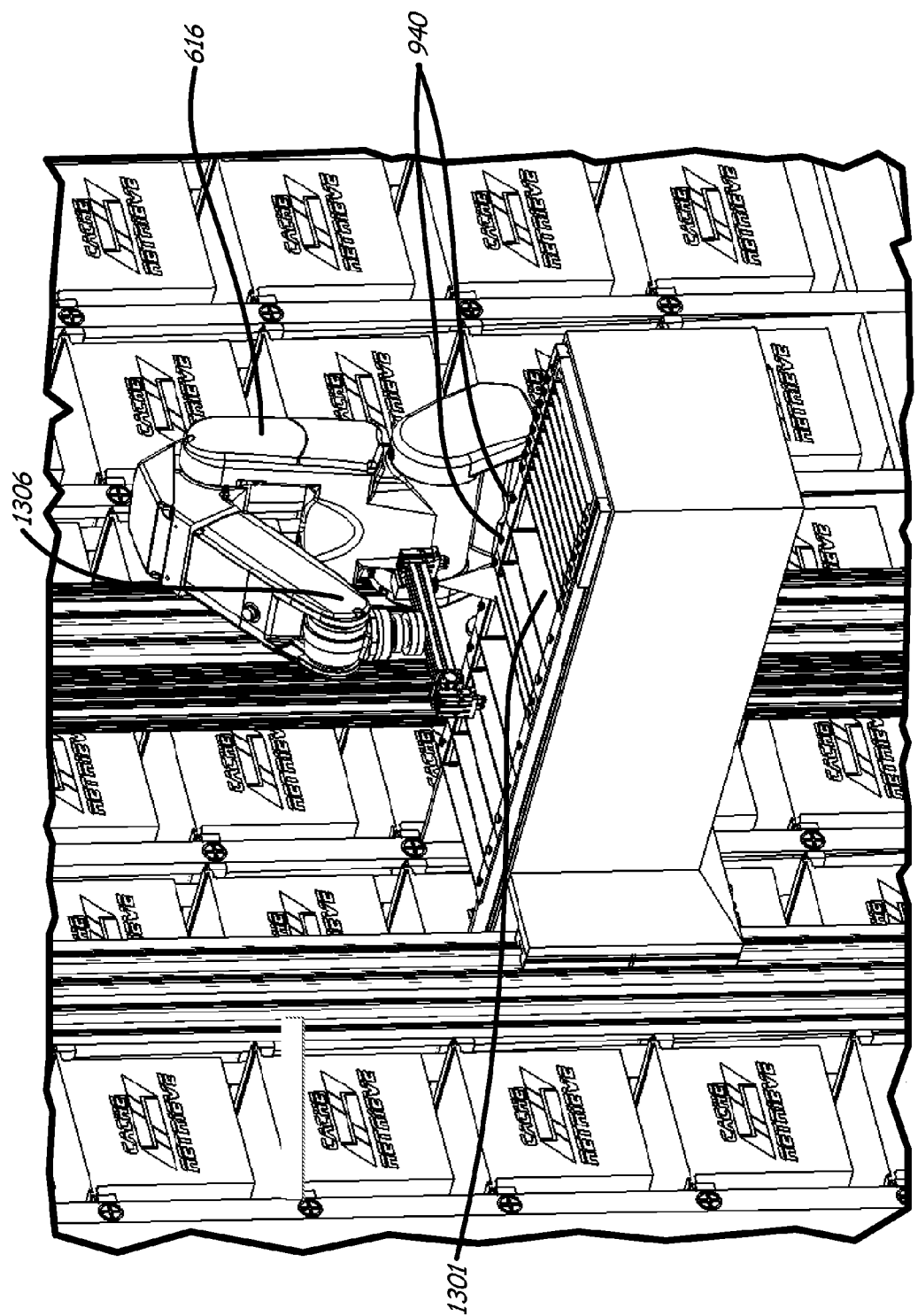
Figures 4, 13:
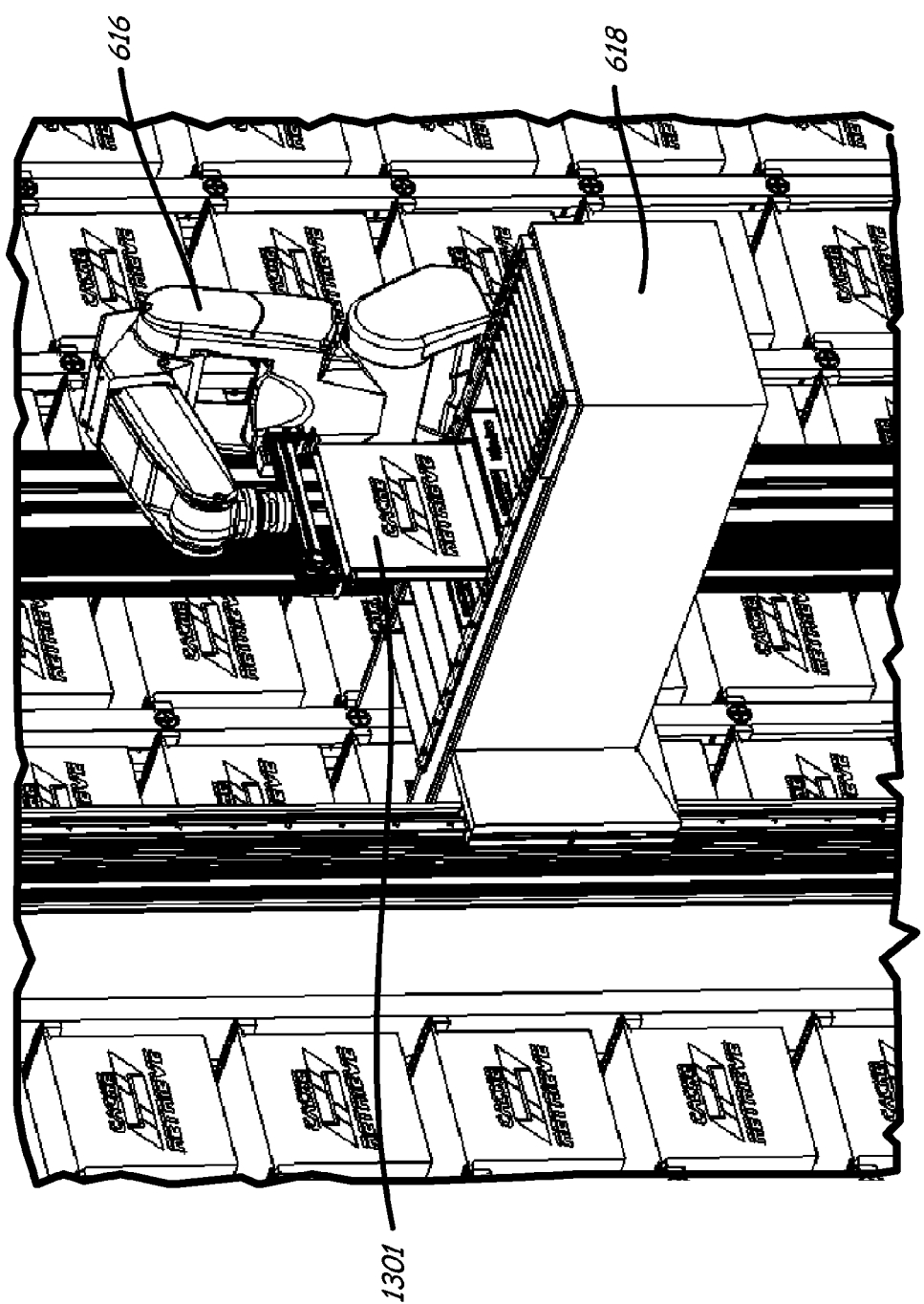
Figures 5, 13:
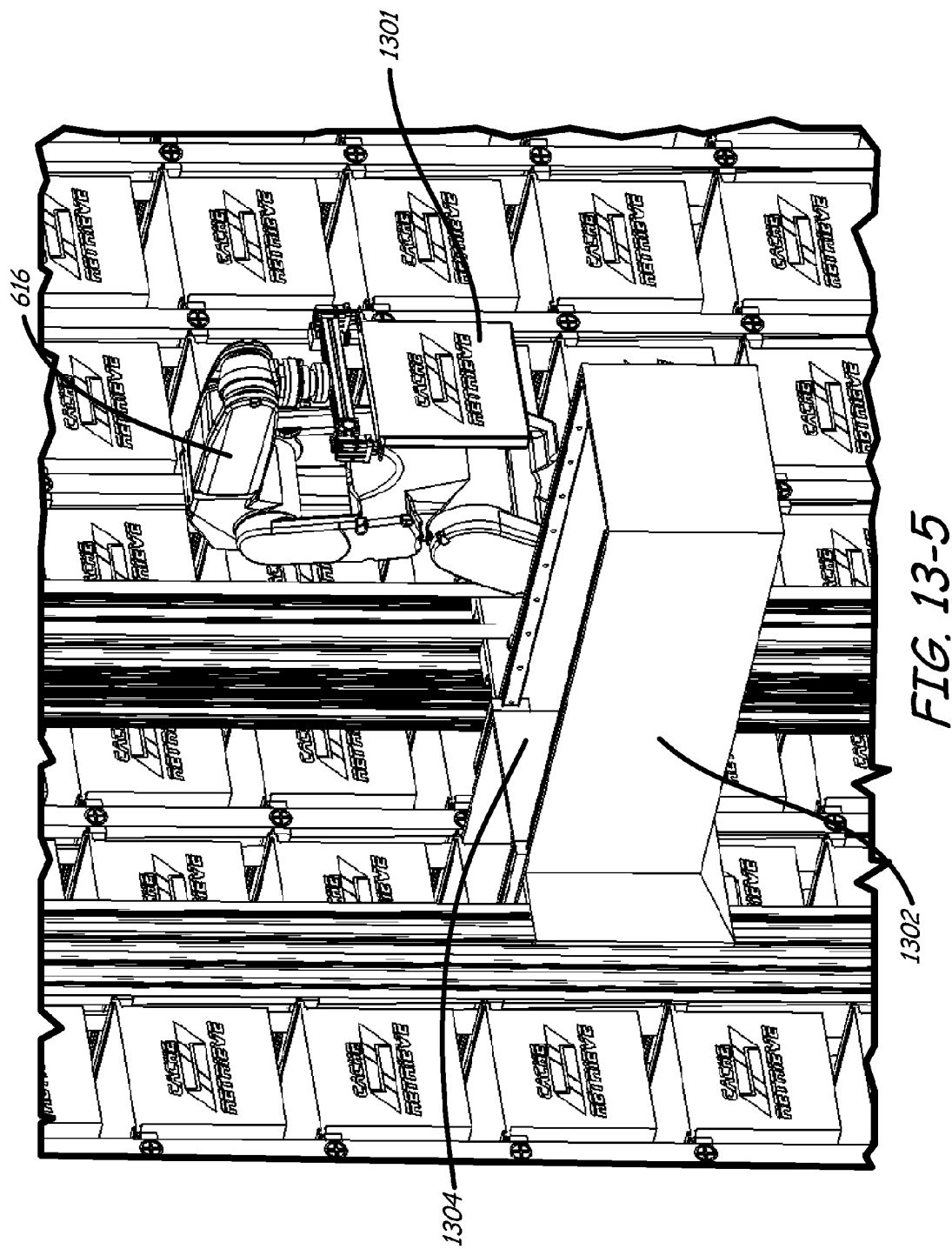
Figures 6, 13:
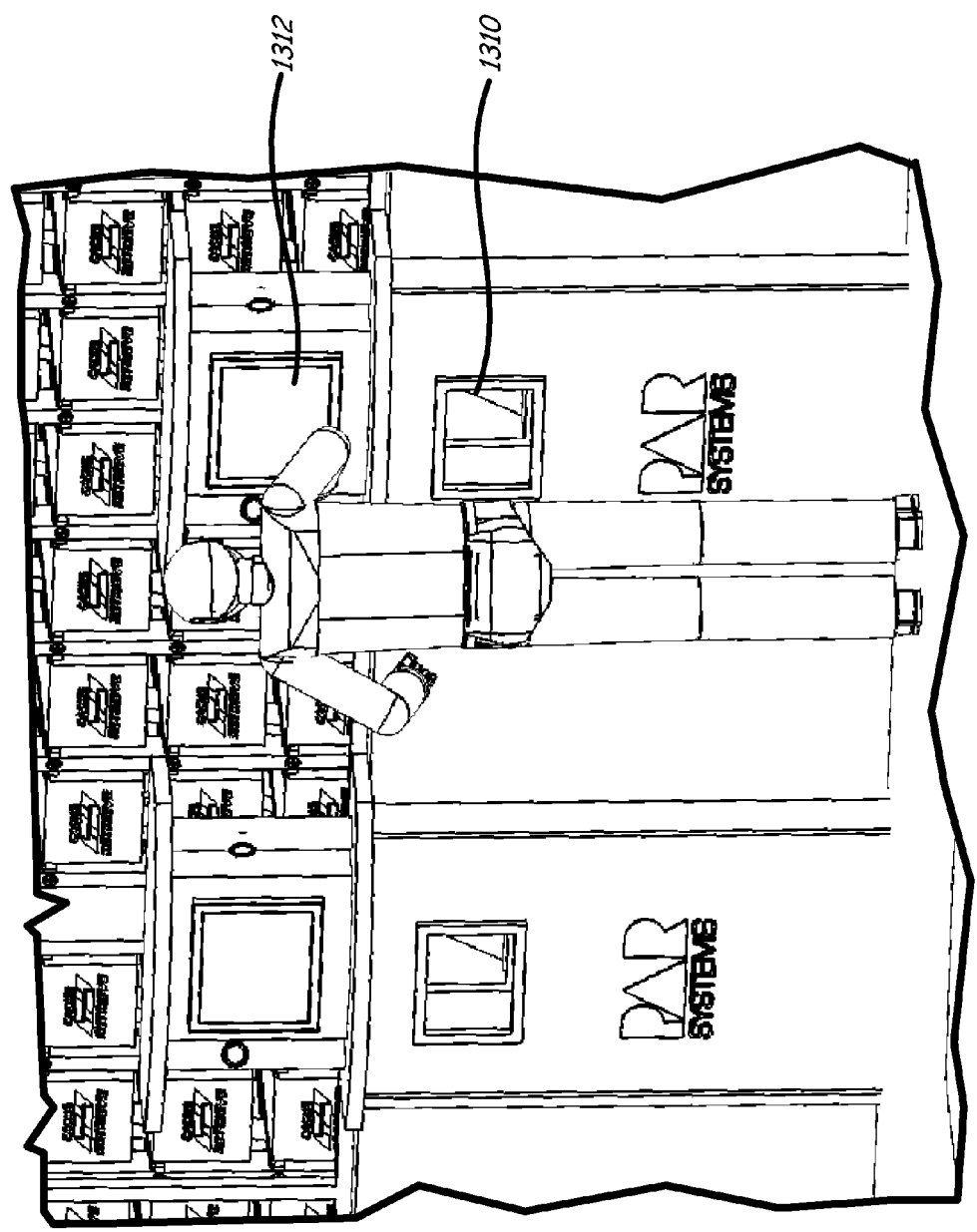

FIG. 5 is a block diagram of one example of a system controller 550 that may be used in a robotic storage and retrieval system (e.g. controller 150 in FIG. 1-1). System controller 550 comprises a conventional computer having a central processing unit (CPU) 554, memory 556 and a system bus 558, which couples various system components, including memory 556 to the CPU 554. The system bus 558 may be any of several types of bus structures including a memory bus or a memory controller, a peripheral bus, and a local bus using any of a variety of bus architectures. The memory 556 includes read only memory (ROM) and random access memory (RAM). A basic input/output (BIOS) containing the basic routine that helps to transfer information between elements within the controller 550, such as during start-up, is stored in ROM. Storage devices 560, such as a hard disk, an optical disk drive, etc., are coupled to the system bus 558 and are used for storage of programs and data. It should be appreciated by those skilled in the art that other types of computer readable media that are accessible by a computer, such as magnetic cassettes, flash memory cards, digital video disks, random access memories, read only memories, and the like, may also be used as storage devices. Commonly, programs are loaded into memory 556 from at least one of the storage devices 560 with or without accompanying data.

Input devices such as a keyboard 562 and/or pointing device (e.g. mouse) 564, or the like, allow the user to provide commands to controller 550. A monitor 566 or other type of output device is further connected to the system bus 558 via a suitable interface and provides feedback to the user. If the monitor 566 is a touch screen, the pointing device 564 can be incorporated therewith. The monitor 566 and typically an input pointing device 564 such as mouse together with corresponding software drivers form a graphical user interface (GUI) 568 for controller 550. Interface(s) 570 allow communication between system controller 550 and other system components. Interface(s) 570 also represent circuitry used to send and receive signals. Commonly, such circuitry comprises digital-to-analog (D/A) and analog-to-digital (A/D) converters as is well known in the art.

Figure 6:
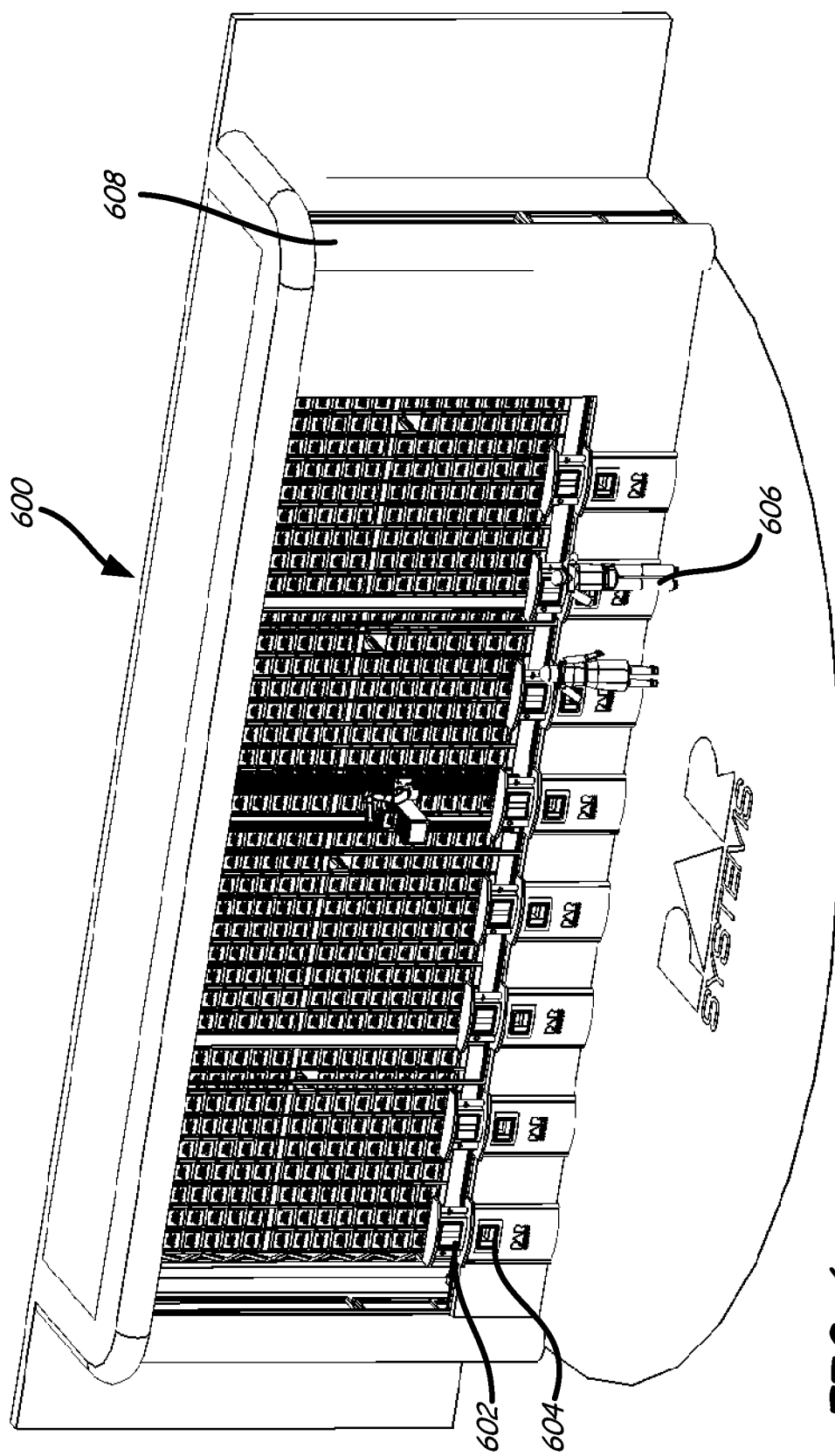
FIG. 6 is a perspective view of a robotic storage and retrieval system that stores articles in bins.

FIG. 6 is a perspective view of another embodiment of a robotic storage and retrieval system, system 600. System 600 optionally includes a number of user interfaces 602 and dispensing areas 604. The figure shows eight sets of user interfaces 602 and dispensing areas 604. Other embodiments may however include more or less (including none) user interfaces 602 and dispensing areas 604.

In an embodiment, one or more users 606 are able to interact with user interfaces 602 to select one of a plurality of articles stored within the system. The system then retrieves the article and dispenses it at the corresponding dispensing area 604. System 600 may also, but not necessarily, include a device such that users 606 can pay for a selected article. For example, system 600 may include a credit card reader and/or a money accepting unit.

Figures 7, 13:
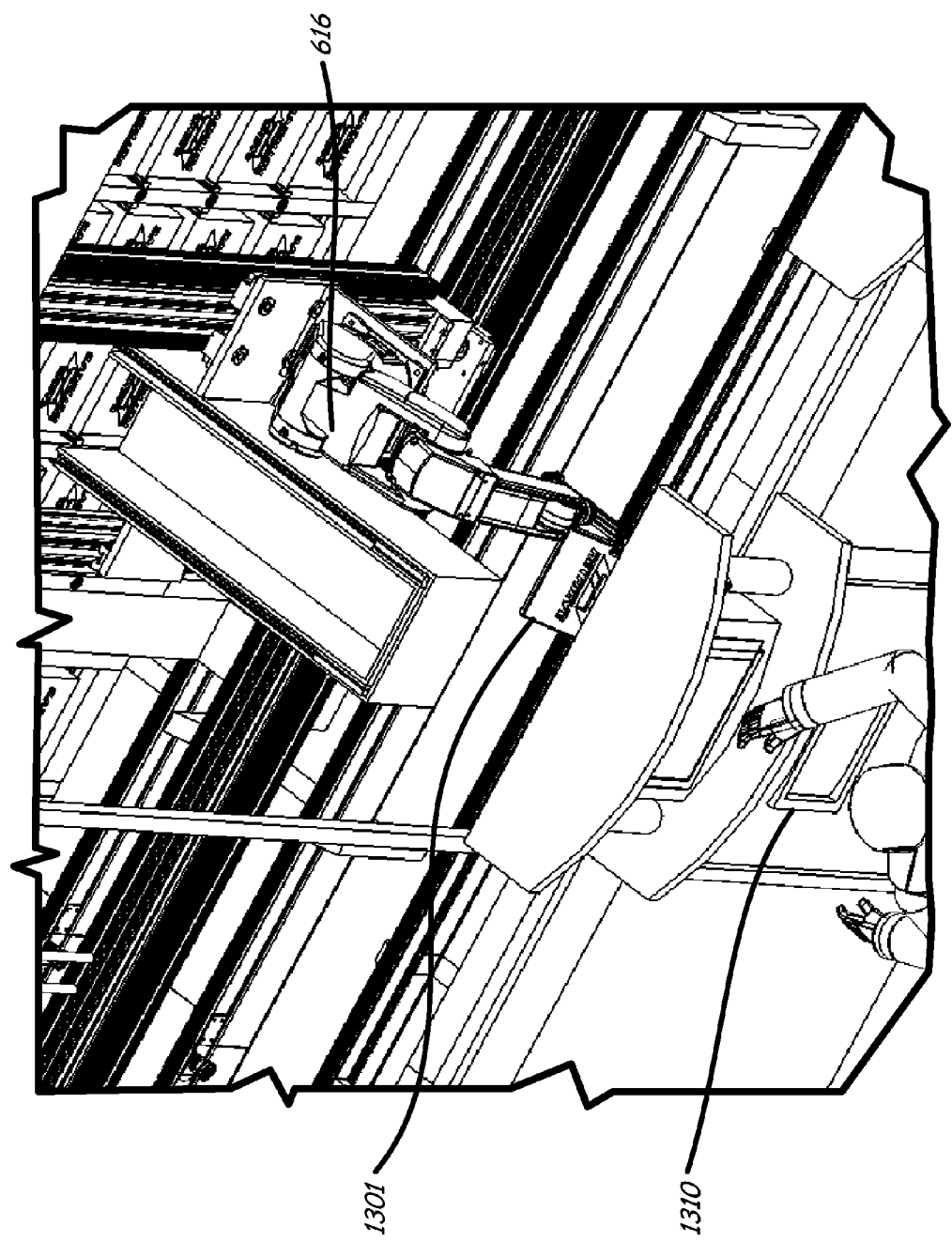

FIG. 6 shows system 600 enclosed by an outer housing or casing 608. FIG. 7 shows system 600 with the outer housing or casing 608 having been removed. FIG. 7 shows that system 600 includes a rack/wall 608 of article holders (e.g. bins). Rack 608 has a width 610, a height 612, and a depth 614. Rack 608 includes a number of columns of article holders along it width 610 and a number of rows of article holders along its height 612. Embodiments of robotic storage and retrieval systems are not limited to any particular number of columns and/or rows and may have more or less columns and/or rows than does the specific example shown in the figure. At each unique combination of row and column position, rack 608 includes a set of article holders. A set of article holders includes one or more article holders along the depth 614 of the rack 608. Each article holder illustratively includes one article.

System 600 further includes an article holder robot 616, an article holder shuttle 618, and one or more conveyor belts 620. In one embodiment, article holder robot 616 and article holder shuttle 618 are carried by a single carriage and can be positioned to any row and column with in rack 608 by a two axes robot positioner. The two axes robot positioner includes vertical rails 622 and horizontal rails 624. Conveyor belts 620 are utilized in unloading empty article holders from the system and loading article holders with articles to the system. Exemplary loading and unloading of article holders from the system are described in greater detail below.

Figure 8:
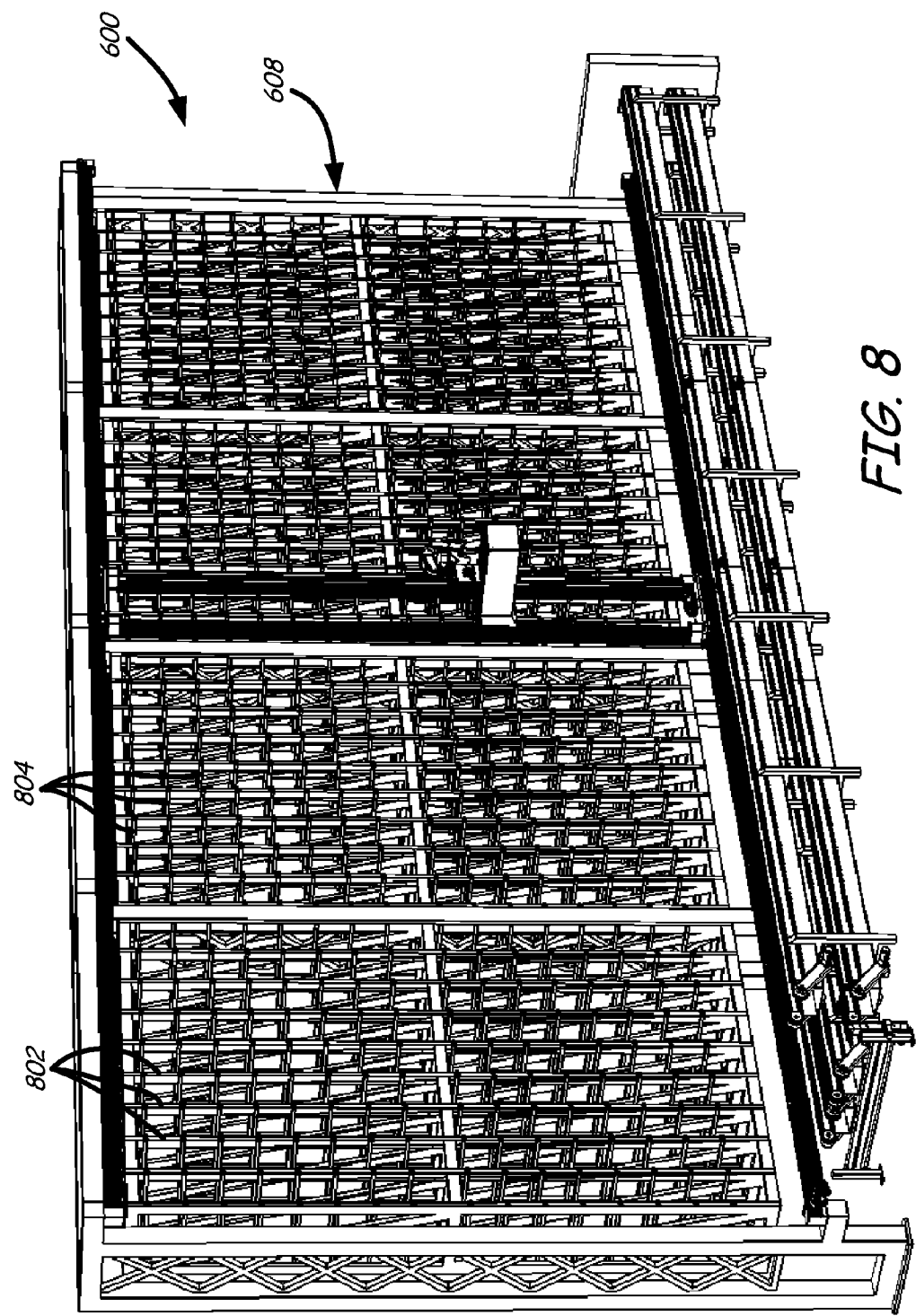
FIG. 8 is a perspective view of a robotic storage and retrieval system that stores articles in bins with both the outer housing and the bins removed.

FIG. 8 shows system 600 with both the outer housing and the article holders having been removed. FIG. 8 shows that the article holders are supported by a number of vertical supports 802 and by a number of horizontal supports 804. Vertical supports 802 and horizontal supports 804 are optionally reconfigurable (i.e. movable) such that the system is able to be adjusted to accommodate different sized article holders and different types of article holders. For example, system 600 can store article holders of any combination of height, width, depth, or type (e.g. folder or bin) by adjusting the positioning of vertical supports 802 and/or horizontal supports 804.

Figure 9:
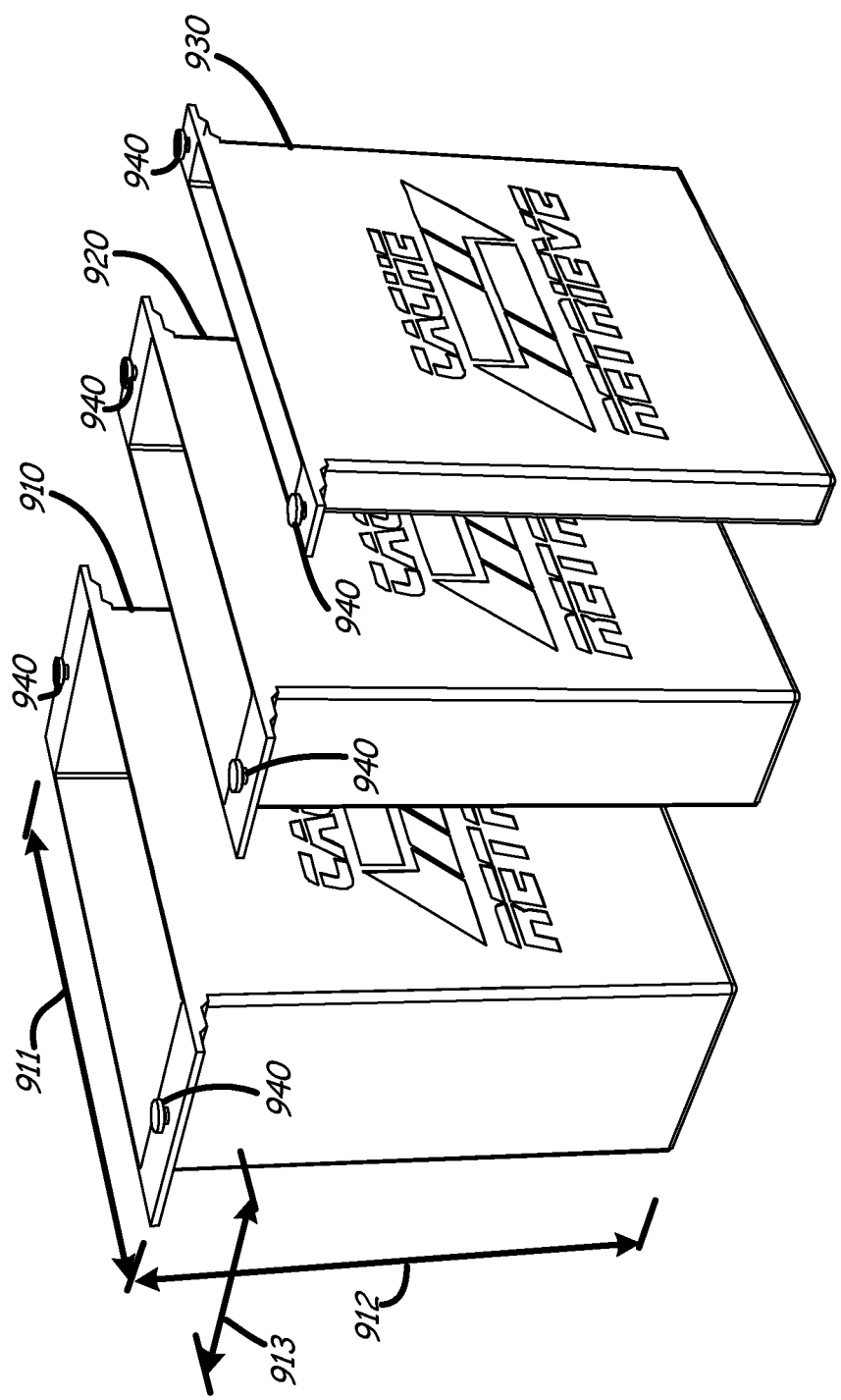
FIG. 9 is a perspective view of bins for storing articles.

FIG. 9 shows three different sized article holders (e.g. bins), namely article holder 910, article holder 920, and article holder 930. The article holders illustratively have the same widths 911 and heights 912. The article holders differ however in having different depths 913. As was previously mentioned, each article holder, in one implementation, holds one article (i.e. one physical unit). The sizes/dimensions of the article holders are optionally optimized in order to maximize storage density. For example, small articles are placed in small article holders, and large articles are placed in large article holders.

Figure 10:
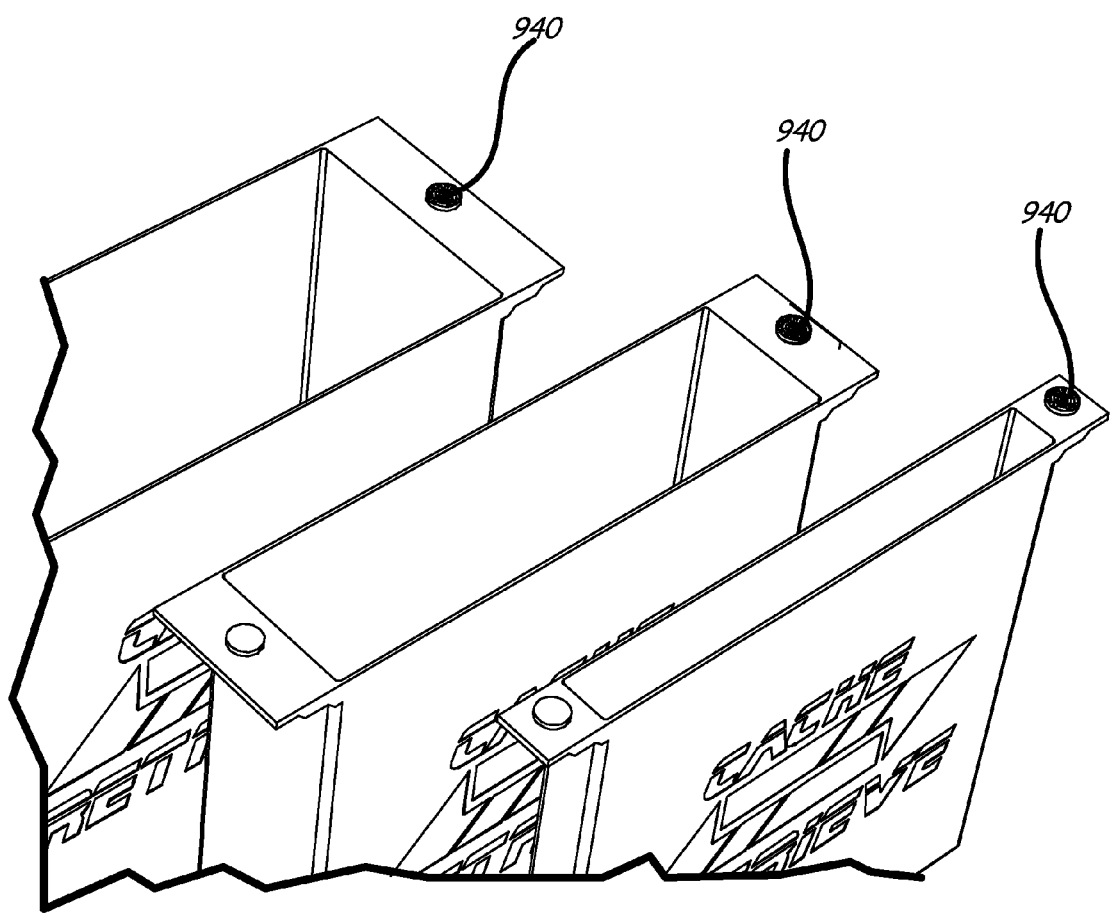
FIG. 10 is a perspective view of bin gripping features.
Figure 11:
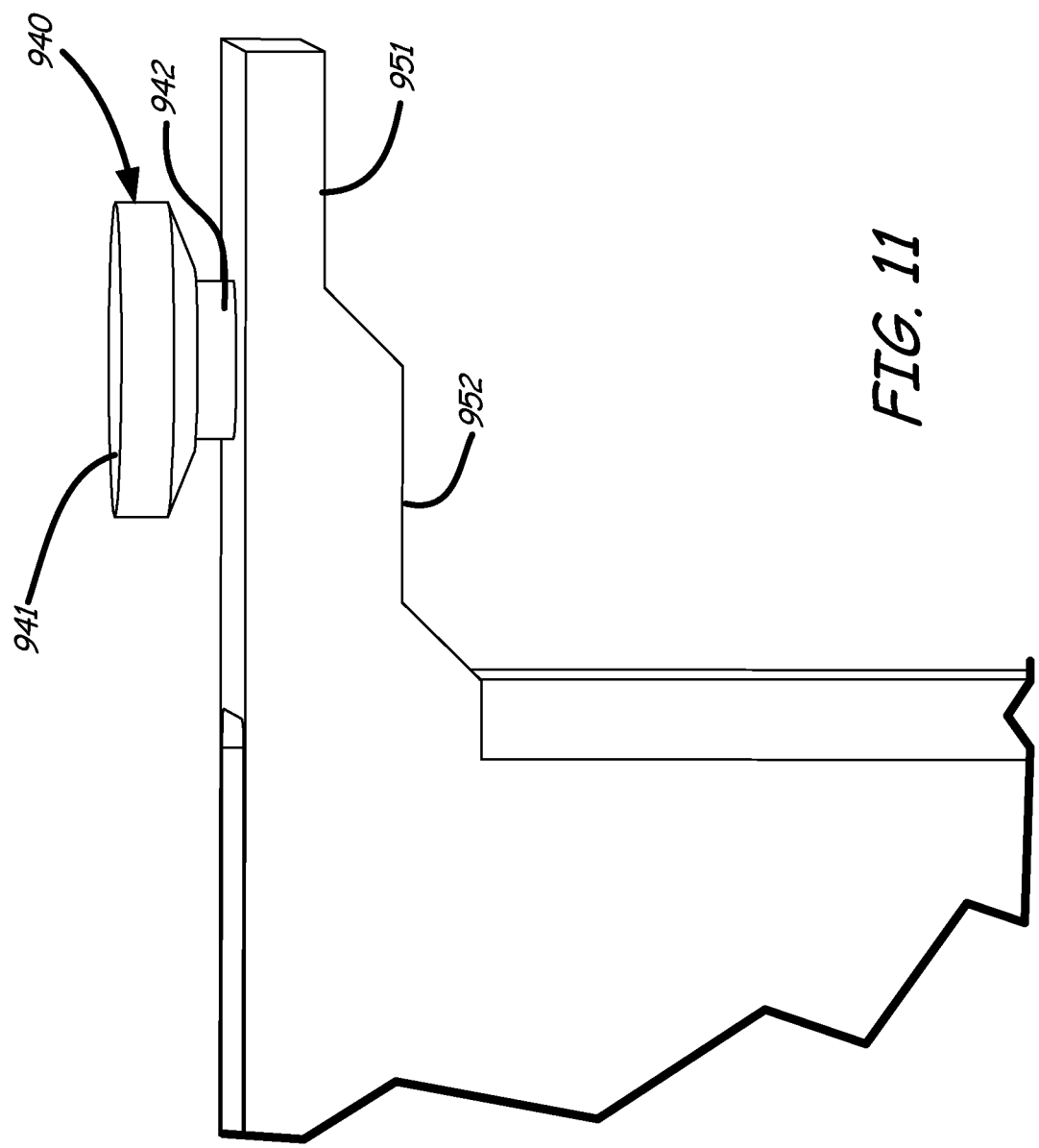
FIG. 11 is a front view of a bin gripping feature.

In an embodiment, each article holder includes a pair of article holder gripping features 940. FIG. 10 shows a more detailed top down view of article holder gripping features 940, and FIG. 11 shows a more detailed side view of article holder gripping features 940.

As is shown most clearly in FIG. 10, the tops of article holder gripping features 940 include a visual identifier such as, but not limited to, a one-dimensional or a two-dimensional barcode. Each identifier specifically identifies each article holder (i.e. each marker is a unique identification number/code for the article holder). Each marker may also include information indicating the size of the article holder. In another embodiment, the article holder identifiers may include non-visual identifiers such as, but not limited to, active or passive radio frequency identification (RFID) tags in place of or in combination with visual identifiers. Furthermore, it should also be noted that article holder identifiers do not necessarily need to be placed on the gripping features 940. Embodiments of the present disclosure include placing the article holder identifiers at any location on or within an article holder.

In addition to uniquely identifying each article holder, article holder gripping features 940 are also optionally utilized to align a robot to an article holder such that a robot is able to pick-up the article holder. For instance, a barcode reader can scan the article holder gripping features of a set of article holders to identify the location of a particular article holder within the set.

Finally, article holder gripping features 940 can be shaped such that they provide a physical structure for a robot to pick-up and handle an article holder. In the particular example shown in FIG. 11, each article holder gripping feature 940 includes a top portion 941 that is wider than a bottom portion 942. This provides for instance a structure that a robot can clasp onto and use to pick-up the article holder.

Figure 12:
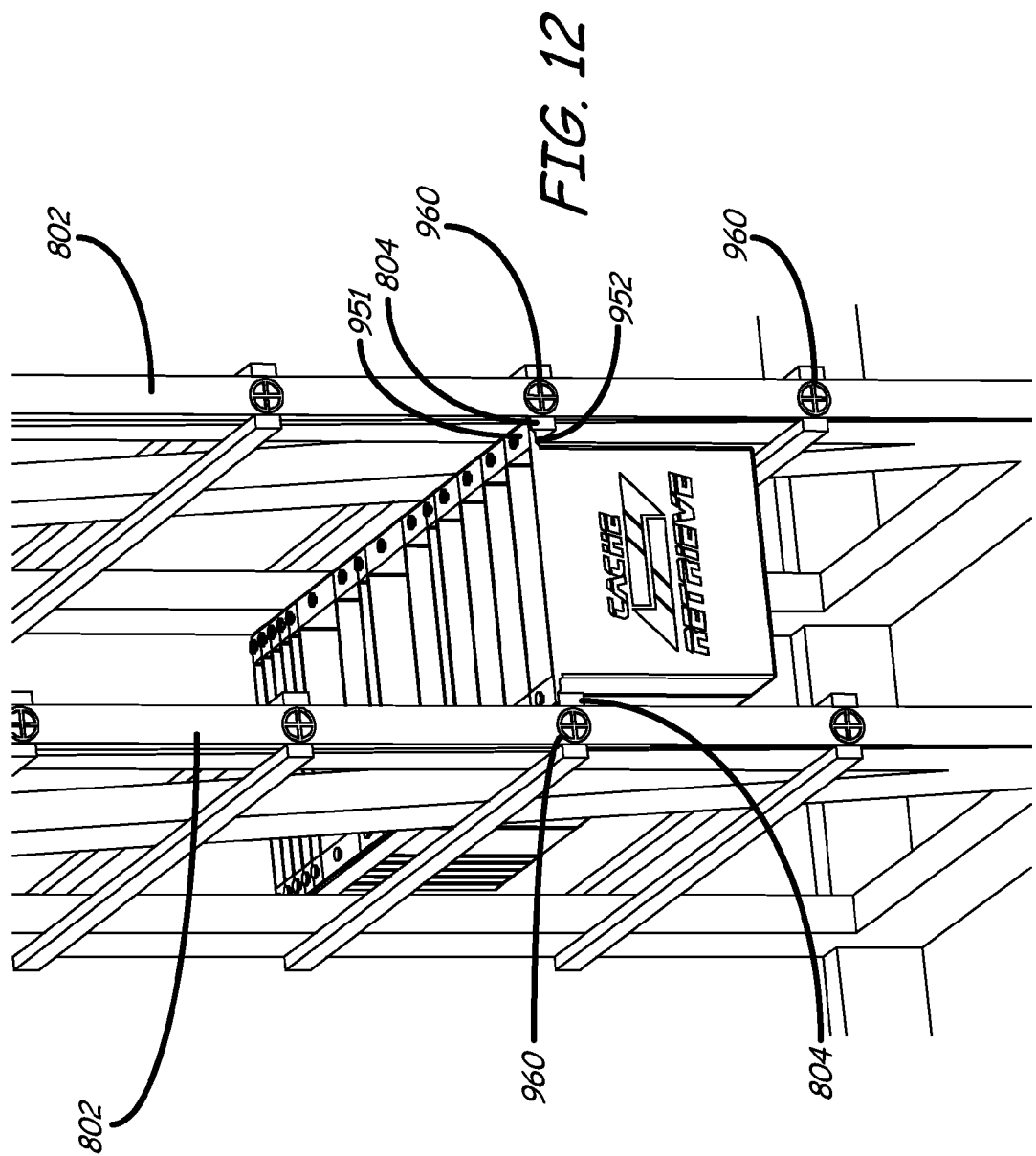
FIG. 12 is a perspective view of a rack having vision system targets.

FIG. 11 also shows that article holders include upper, outer flanges 951 and lower, inner flanges 952. As is shown in FIG. 12, in an embodiment, outer flanges 951 are used to support an article holder on horizontal supports 804. The outer flanges 951 are optionally contoured such that the article holders are self-centering and skew resistant. The inner flanges 952 provide a surface/handling area for a robot, such as article holder robot 616 in FIG. 6, to pick-up and otherwise handle an article holder.

Finally in regards to FIG. 12, the figure shows that the system includes markers 960 that are optionally placed on the vertical supports 802. Markers 960 are illustratively used to identify positions within the rack of article holders. For instance, markers 960 can be used for a robot to align itself to a top of a row of article holders before scanning the barcodes of the article holders.

FIGS. 13-1 through 13-7 illustrate the retrieval of an article from within the system. As was discussed in regards to FIG. 6 above, a user selects an article (e.g. by using a user interface) that he or she wants to be dispensed from the system. The system includes a database having information indicating which set (i.e. which column and row of the rack) that each article holder is located in, and what article is included within each article holder.

Once the user selects an article, the system retrieves information from the database to determine which article holder or article holders the article is located in. The system also retrieves information from the database to determine where in the rack the corresponding article holder or article holders is located. The article holder robot and article holder shuttle then move to the appropriate set.

FIG. 13-1 shows article holder robot 616 and article holder shuttle 618 in position to remove an article that a user has selected. In an embodiment, robot 616 and 618 are carried by a single carriage that is movable on one or more support rails (e.g. rails 622 and 624 in FIG. 7). FIG. 13-1 shows that article holder shuttle 618 includes an outer support portion 1302 and an inner telescoping support member 1304. Once article holder shuttle 618 is in place, it extends inner telescoping support member 1304 outward to go beneath the inner flanges 952 (shown and labeled in FIG. 11) of the article holders within the set. The article holder shuttle 618 is then moved upward to lift the article holders off from the horizontal supports 804 (shown and labeled in FIGS. 8 and 12), and the inner telescoping support member 1304 is moved backwards back into the outer support portion 1302.

FIG. 13-2 is an illustration of the article holders 1301 within one set having been removed from the rack and put into the article holder shuttle inner telescoping support member 1304. In one embodiment, all of the article holders within one of the rack positions (e.g. one set of article holders) are removed and put into the inner telescoping support member 1304. However, in another embodiment, only a portion of the article holders within a position of the rack are removed and put into the inner telescoping support member 1304.

Once the article holders 1301 are in the article holder shuttle, as is shown in FIG. 13-3, a reader 1306 (e.g. a barcode reader, RFID reader, etc.) scans the article holder identifiers 940 (e.g. visual or non-visual identifiers on the gripping features) of the article holders 1301 in the shuttle. The reader scan enables the system to identify where in the article holder shuttle the desired article holder is located. The reader may scan all of the article holders in the shuttle or may alternatively only scan article holders until the desired article holder is identified.

After the position of the desired article holder is located, in FIG. 13-4, article holder robot 616 lifts the desired article holder 1301 up and out of the article holder shuttle 618. In FIG. 13-5, inner telescoping support member 1304 of the article holder shuttle extends out from support portion 1302 and returns the rest of the article holders to the rack. In one embodiment, some or all of the remaining article holders are moved prior to placement in the rack. The article holders are illustratively moved such they are positioned as far back in the rack as possible. This may allow for example for reduced time in subsequent restocking of the set or provide necessary stock rotation. Embodiments of the present disclosure are not however limited to any particular method of returning article holders to the rack. For example, in one embodiment, article holder robot 616 is used to reposition the article holders within the shuttle before returning them to the rack. In another embodiment, the article holder shuttle temporarily puts one or more article holders on the rack, and then picks them up into a different article holder shuttle location before finally positioning the article holders within the rack.

In FIG. 13-6, the article holder robot has moved from the set of article holders where it retrieved the article holder to the dispensing station 1310. Dispensing station 1310 may be associated with a user interface 1312 such as, but not limited to, a user interface that the user used to select the desired article.

In FIG. 13-7, article holder robot 616 has placed article holder 1301 on a pivoting hinge and then tilts or angles the bottom of the article holder 1301 up. This empties the user selected article from the article holder 1301 to the dispensing station 1310 where the user is able to retrieve the article. Although one specific dispensing method has been described, it should be noted that embodiments are not limited to any particular method and other methods may be used to dispense the article. In one embodiment, after dispensing the article, article holder robot 616 reorients article holder 1301 such that the flange surfaces 951 and 952 (shown and labeled in FIG. 11) are facing downward, and then places the empty article holder 1301 on a conveyor that moves the article holder away from the dispensing station.

Figures 1, 14:
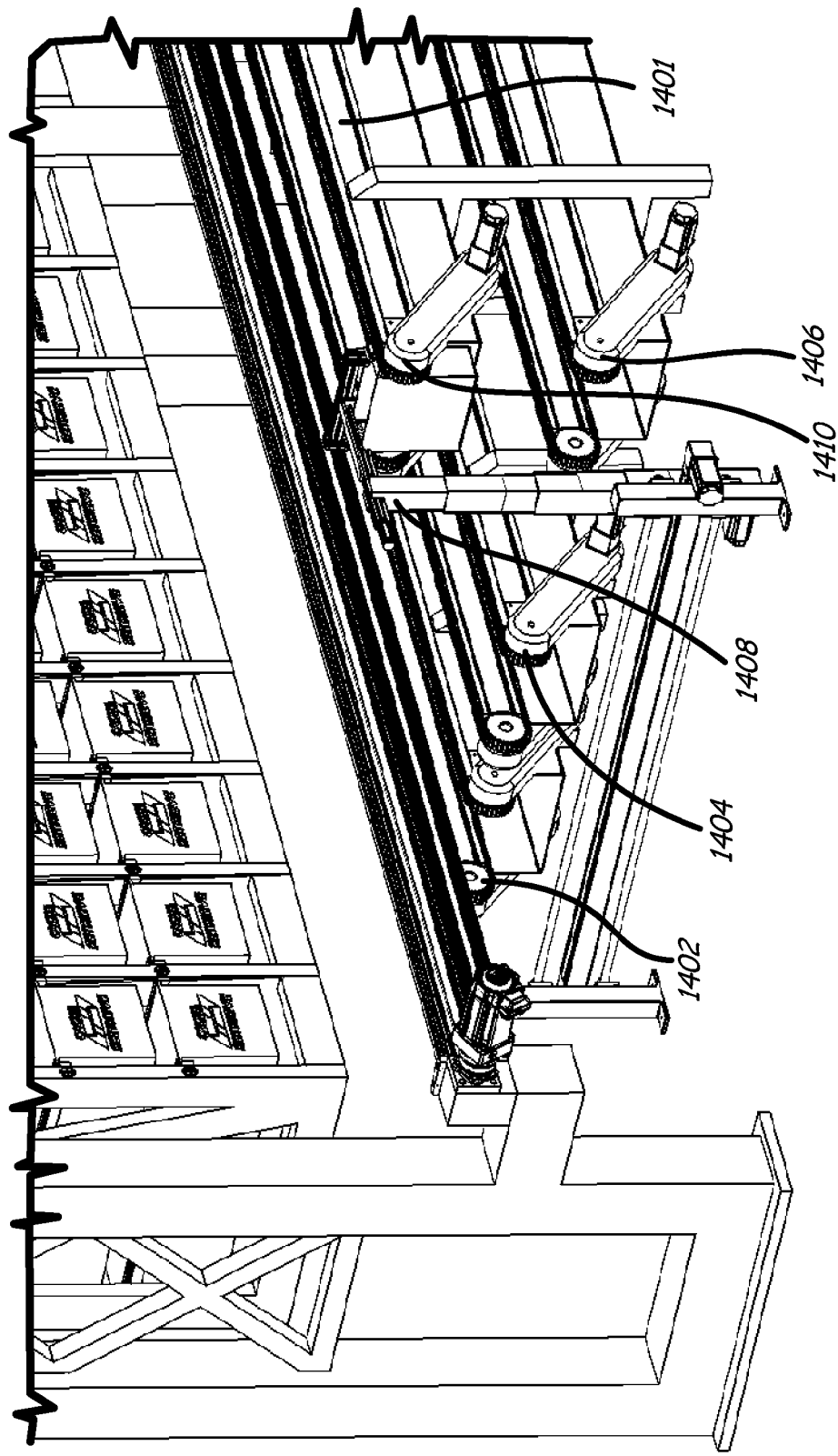
Figures 2, 14:
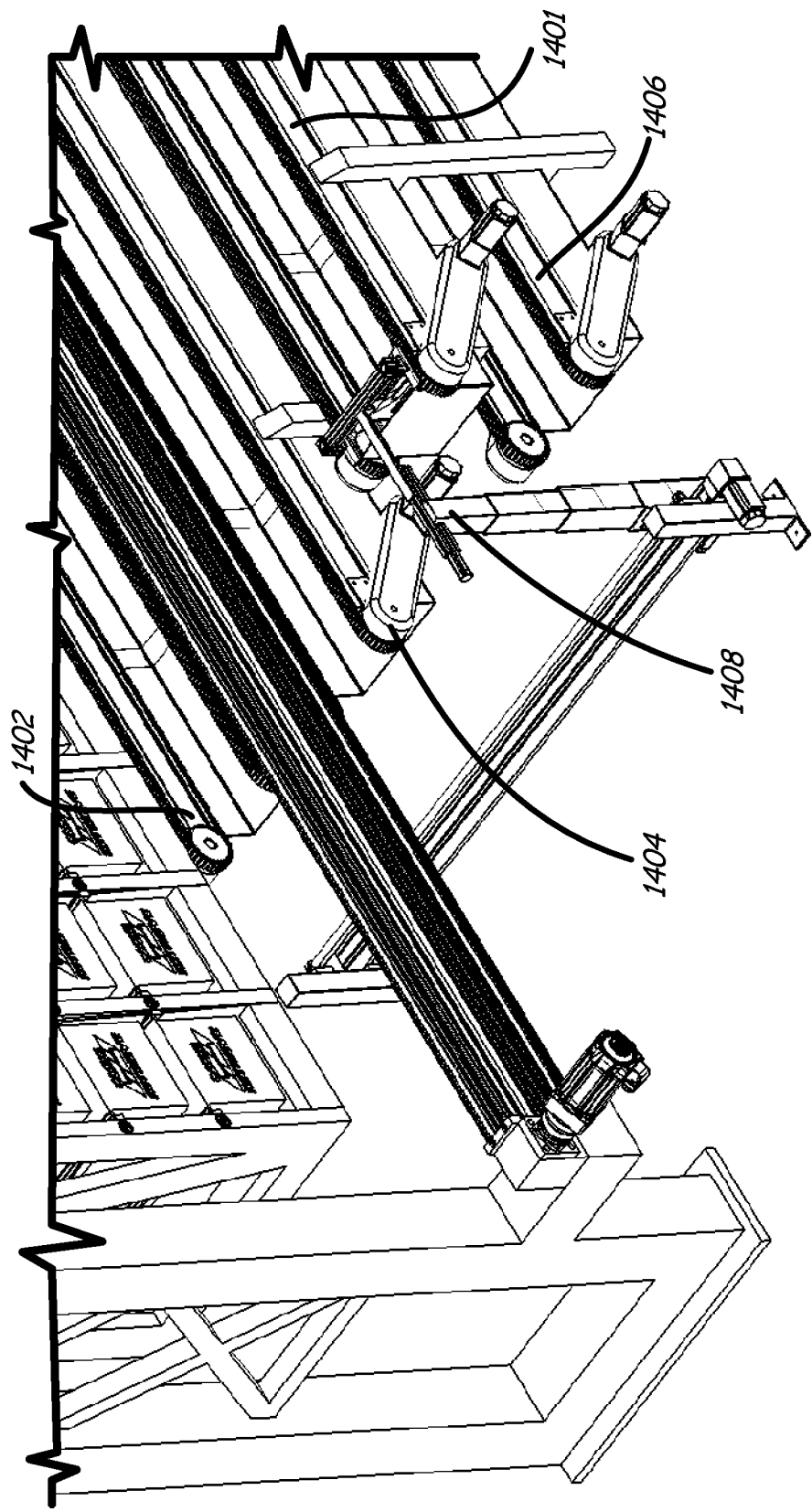

FIGS. 14-1 and 14-2, illustrate certain embodiments of devices and methods associated with the sorting and storage of empty article holders. Embodiments of the present disclosure are not however limited to any particular devices and methods for accomplishing such tasks and illustratively include any combination of devices and methods. For instance, the embodiments shown in FIGS. 14-1 and 14-2 utilize conveyors in sorting and storing empty article holders. Embodiments do not however need to have conveyors. In certain other embodiments for example, no conveyors are used, and empty article holders are instead handled and/or sorted utilizing the same robots that are used to store/retrieve articles from a rack.

In the particular example shown in FIG. 14-1, the system optionally includes an upper conveyor 1401 and three lower conveyors 1402, 1404, and 1406. As was described above, after an article has been emptied from an article holder, the article holder is in one embodiment placed on the upper conveyor 1401 at the location where the article is dispensed. The empty article holder is then moved by the conveyor 1401 to the end 1410 of the conveyor.

At the end of the conveyors, the system includes an article holder sorting robot 1408. The figures show article holder sorting robot 1408 as being implemented as a linear axis robot. Embodiments of article holder sorting robot 1408 are not however limited to any particular implementation.

Article holder sorting robot 1408 picks-up empty article holders from the top conveyor 1401 and places them for storage on one of the lower conveyors 1402, 1404, or 1406. The system illustratively includes one lower conveyor for each size of article holder being used by the system. For instance, in a case where three different article holder sizes are being used, a system has three lower conveyors, one conveyor for each of the three sizes of article holders. In an embodiment, article holder sorting robot 1408 places the empty article holders at the ends of the lower conveyors. The lower conveyors then move the empty article holders forward to make space for additional empty article holders to subsequently be placed on the conveyors. FIG. 14-2 shows a view of article holder sorting robot 1408 moving an empty article holder from the upper conveyor 1401 to one of the lower conveyors 1402, 1404, or 1406.

FIGS. 15-1, 15-2, 15-3, and 15-4 illustrate certain embodiments of devices and methods associated with the restocking of a system. Again, embodiments of the present disclosure are not limited to any particular devices and methods for accomplishing such tasks and illustratively include any combination of devices and methods.

Figures 1, 15:
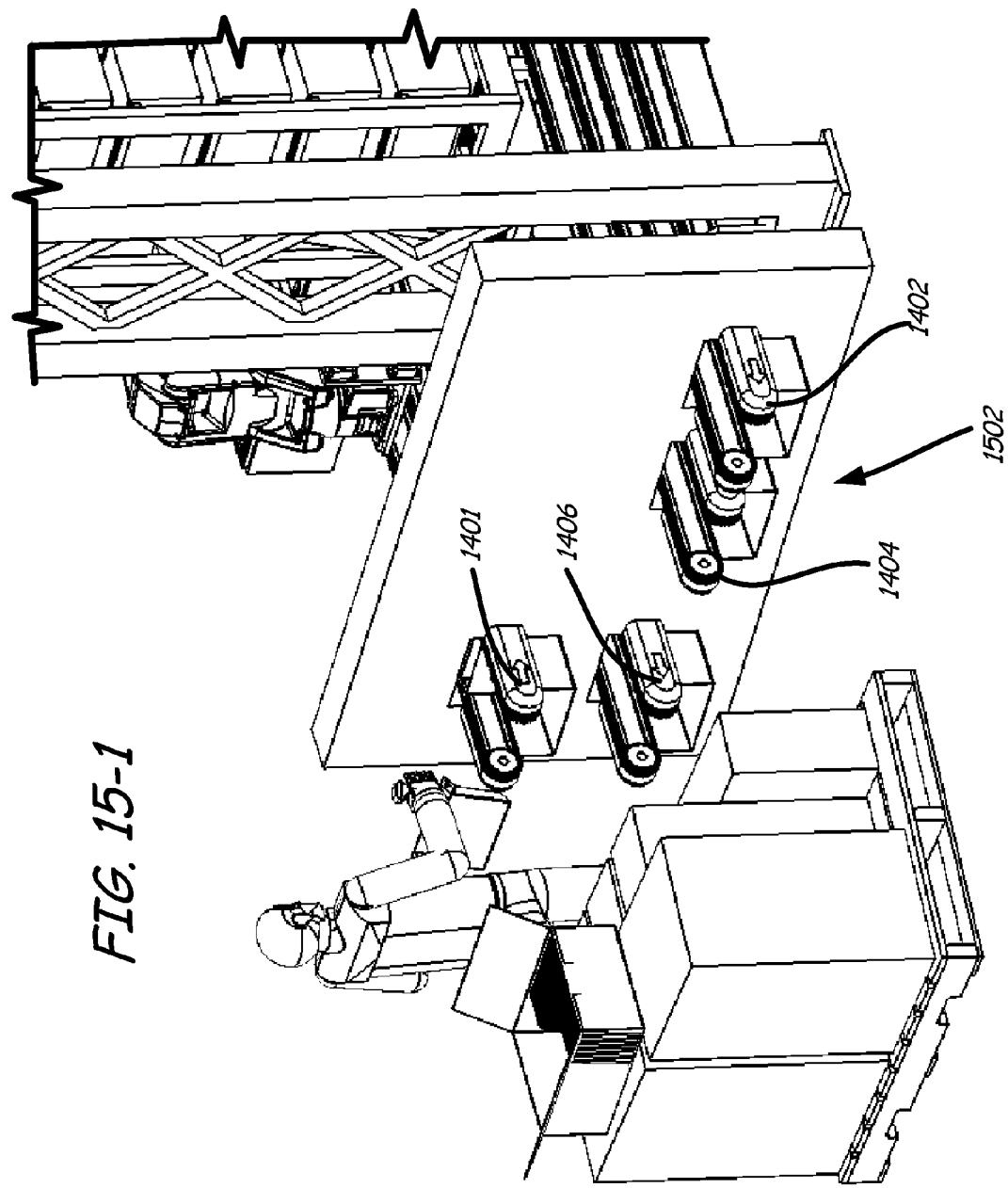
Figures 2, 15:
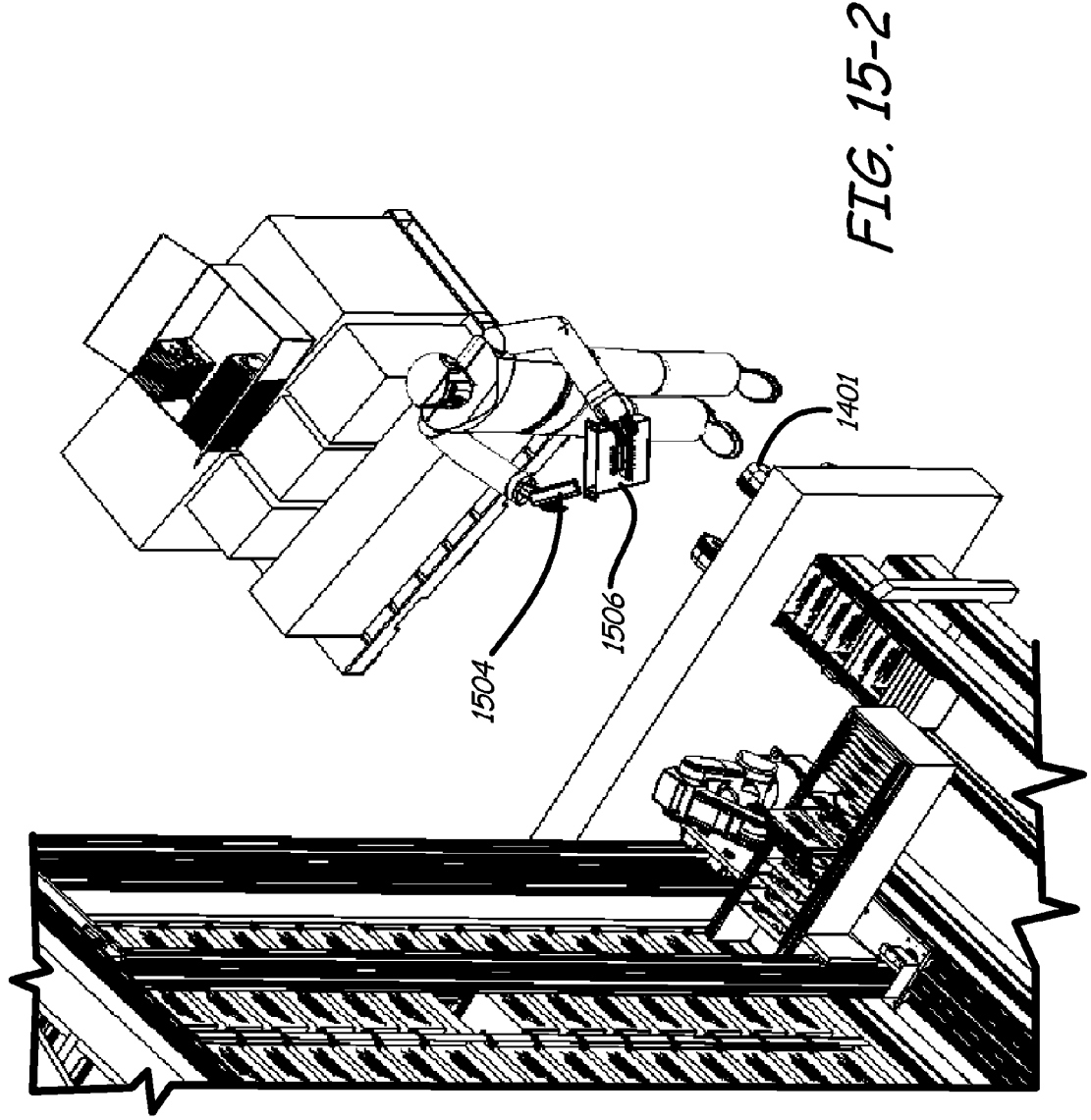
Figures 4, 15:
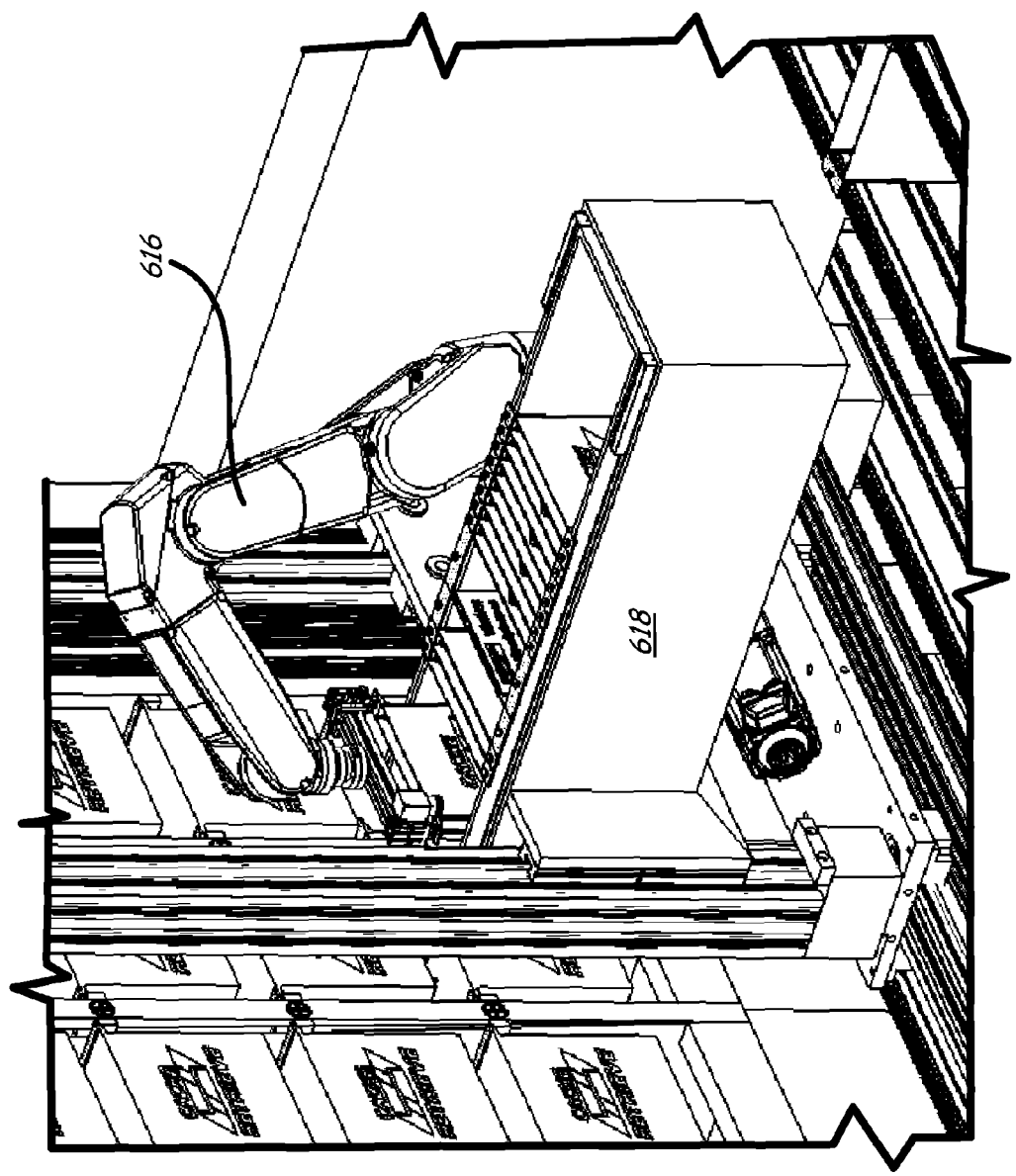
Figures 5, 15:
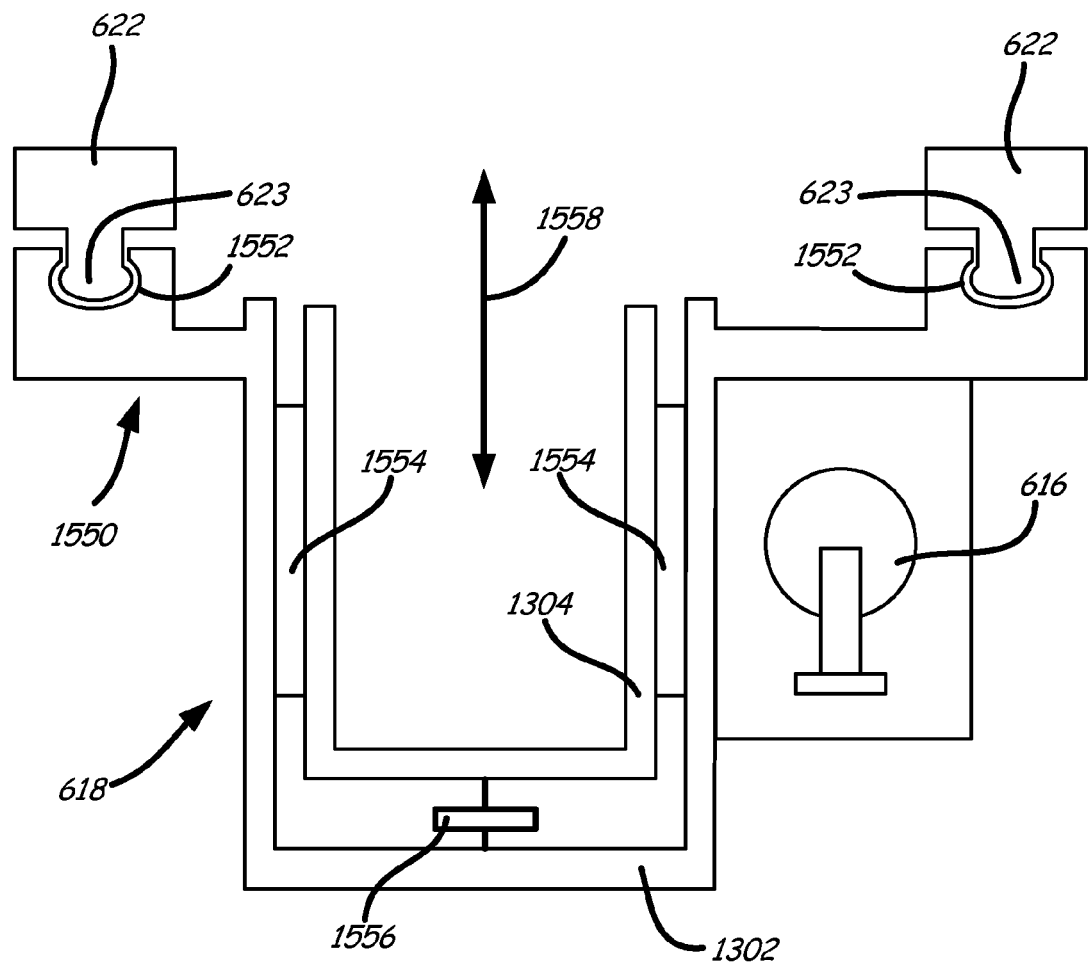
Figures 6, 15:
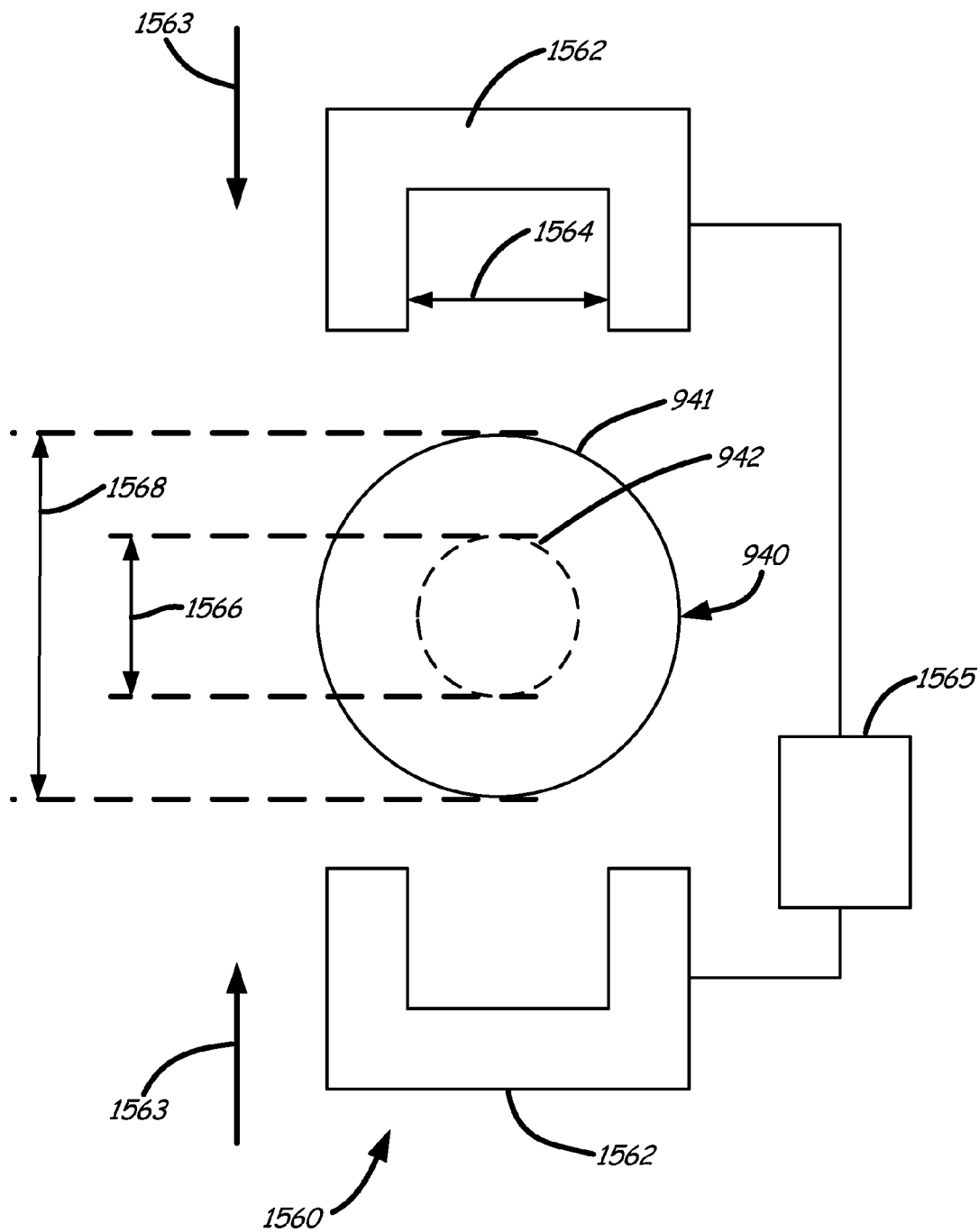
Figures 7, 15:
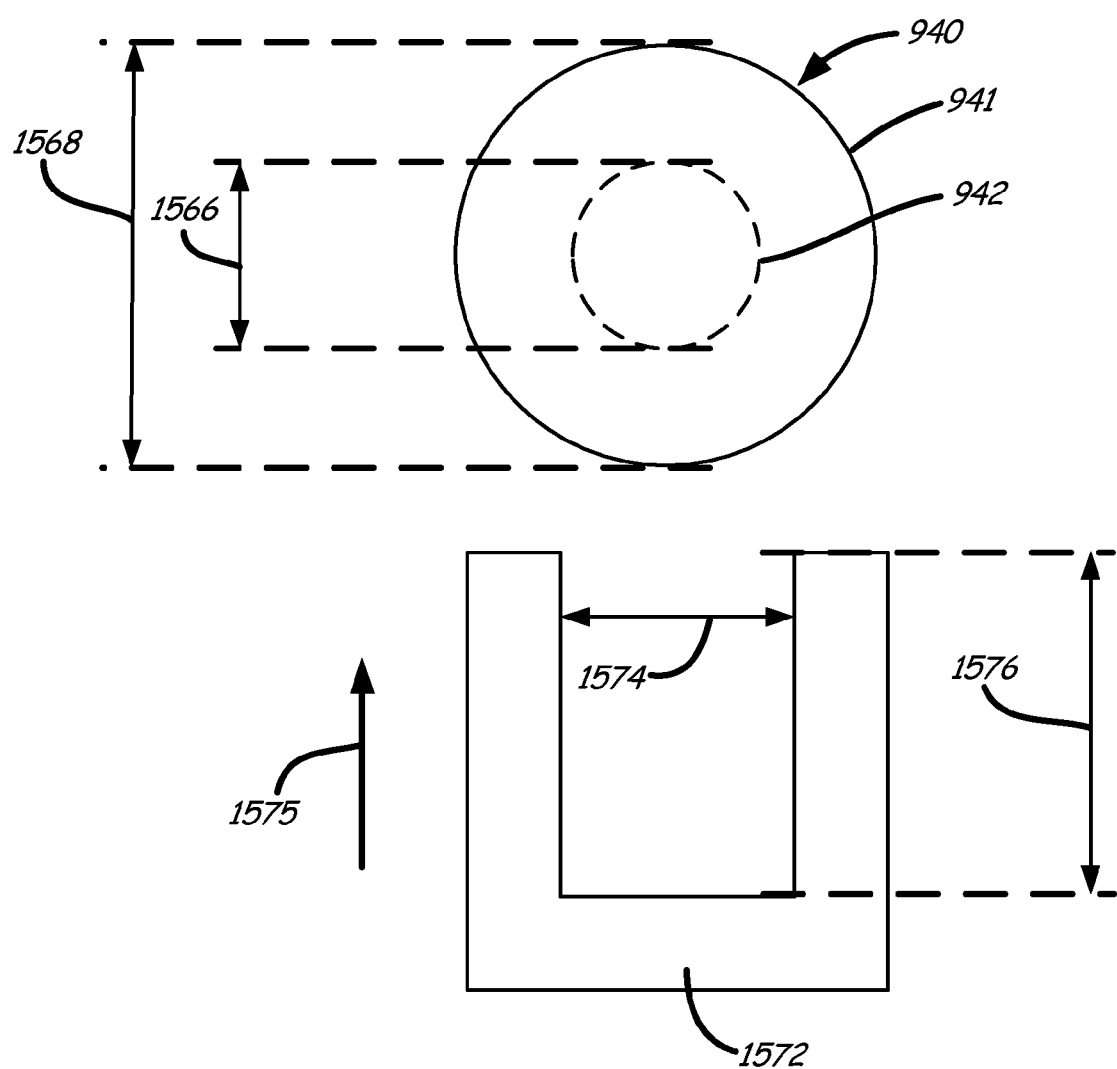

As is shown in FIG. 15-1, one end of a robotic storage and retrieval system illustratively includes a restocking station 1502. The restocking station 1502 is, in one embodiment, at the opposite end of the system from the empty article holder sorting and storage station (shown in FIGS. 14-1 and 14-2).

Restocking station 1502 optionally includes an upper conveyor 1401 and three lower conveyors 1402, 1404, and 1406. The conveyors are illustratively the same conveyors used in the article holder sorting and storage operations. In one embodiment, the system is able to be set to two distinct operational modes. One of the modes corresponds to article retrieval, and the other mode corresponds to article restocking operations. The mode selected determines the operation of the system (i.e. restocking articles or retrieving articles).

Lower conveyors 1402, 1404, and 1406 carry empty article holders to a user. Again, a system optionally includes one lower conveyor for each size of article holder used by the system. For restocking, a user first picks-up an empty article holder from one of the lower conveyors. The user then selects an article to be stored in the article holder. The user illustratively pairs an article holder with an article based on the size of the article holder and the size of the article. For example, the user chooses the smallest possible article holder that can hold the article. This may help to maximize article density within the system.

Then, as is shown in FIG. 15-2, the user uses a reader/scanner 1504 (e.g. a barcode reader) and scans both the barcode or other identifier of the article and the barcode or other identifier of the article holder. This information is then sent to the system's database so that it knows what article is in each article holder. The user then puts the article in the article holder and places the article holder on the upper conveyor 1401.

For the restocking operation, the article holder shuttle retrieves a set of article holders from the rack. In one embodiment, the article holder shuttle retrieves the article holders from the set that has the most space for additional article holders. Then, once the user has placed one or more article holders for storage on the upper conveyor 1401, the article holder robot begins to load the article holders into the article holder shuttle.

FIG. 15-3 shows that article holder robot 616 uses it reader/scanner 1306 to scan the identifiers of the article holders in the top conveyor 1401. These are the article holders that the user has loaded with articles and placed on the top conveyor 1401. Robot 616 then, as is shown in FIG. 15-4, picks-up an article holder and places it into the article holder shuttle 618. Once the article holder shuttle 618 is loaded with one or more article holders (e.g. as many article holders as it can hold), it returns the article holders loaded with articles to the set in the rack. The system updates its database so that it knows where each article holder is located for later retrieval. This process is optionally continued until all of the articles that are desired to be stocked are stocked.

Some of the embodiments discussed above (e.g. the embodiment shown in FIG. 7) have been described and illustrated as including conveyor based systems for handling empty article holders (e.g. files or bins). As previously mentioned, embodiments are not however limited to only having conveyor based systems. For example, in another embodiment, robotic storage and retrieval systems have no conveyors and instead may utilize one or more robots or other devices to handle the empty containers.

It should also be noted that embodiments of robotic storage and retrieval systems are not limited to any particular orientation. For example, FIG. 1-1 shows an illustrative coordinate system 101 having an x-axis, a y-axis, and a z-axis. In the embodiment shown in the figure, the columns are arranged along the x-axis (e.g. the figure shows thirteen columns along the x-axis), the rows are arranged along the y-axis (e.g. the figure shows nineteen rows along the y-axis), and the article holders are grouped into sets of article holders along the z-axis. Embodiments of the present disclosure may include any orientation. For instance, in another embodiment, the rows and columns are arranged along the z- and x-axes with the article holders being grouped into sets of article holders along the y-axis (i.e. the sets of article holders are stacked vertically). Embodiments of the present disclosure include racks having rows, columns, and sets of article holders having any orientation.

It should be further noted that certain embodiments of the present disclosure have been described as having article holders with each article holder having a unique identifier (e.g. a unique barcode code, RFID tag, etc.). Embodiments do not necessarily need to have a unique identifier on each article holder. In another embodiment, each article holder does not have a unique identifier. In such a case, a system's database stores information indicating what articles are stored in which positions. Or, in other words, each article included within the system has a unique physical address (e.g. row, column, and position within a set of article holders). The database stores this information when loading/restocking the system with articles, and the database utilizes the information to retrieve articles. For example, once a user selects an article to be retrieved, the system utilizes its database to determine a location or locations within a rack where the article is located. The system then retrieves an article from the location or from one of the multiple locations if there is more than one of the user selected articles in the system, and then dispenses the article to the user.

FIG. 15-5 is a top-down schematic view of one embodiment of a robot 616 and shuttle 618. As can be seen in the figure, the robot 616 and shuttle 618 are illustratively connected together and carried by a single carriage 1550 that is movable along rails 622. In one embodiment, rails 622 include rail portions 623 that fit within apertures 1552 of carriage 1550 such that carriage 1550 is able to move up and down vertically along rails 622. Movement of the carriage 1550 can be accomplished through well known drive assembly devices such as, but not limited to, actuators (e.g. hydraulic, pneumatic, or electric), electric linear motors, conveyor mechanisms, ball screw actuators, or pinion gears driven on racks provided on rails 623. Embodiments of the present disclosure are not however limited to any particular implementation and can include other mechanisms for moving carriage 1550.

As previously described, shuttle 618 includes an outer support portion 1302 and an inner telescoping support member 1304. Shuttle 618 also optionally includes one or more slides 1554 that attaches inner support member 1304 to support portion 1302, and that enables inner support member 1304 to be extended and retracted in the directions shown by arrow 1558. Slides 1554 are not limited to any particular devices and may include devices such as, but not limited to, friction slides, ball-bearing slides, roller bearing slides, progressive action slides, rails, and guides. Shuttle 618 further optionally includes an actuator 1556 (e.g. hydraulic, pneumatic, or electric) that provides motion to and controls movement of inner support member 1304. In the specific embodiment shown in the figure, actuator 1556 is shown as being behind inner support member 1304. Embodiments are not however limited to any particular configuration, and actuator 1556 can be placed at other locations relative to support member 1304. For example, actuator 1556 can be placed below, above, to the side, or in front of support member 1304.

FIG. 15-6 is a top-down schematic illustration of a clamp device 1560 that can be used by a robot to handle (e.g. pick-up and carry) an article holder. An article holder illustratively includes one or more gripping features 940 having a top portion 941 and a bottom portion 942. A perspective view of a gripping feature top portion 941 and bottom portion 942 are shown for example in FIG. 11. In certain embodiments, an article handling robot (e.g. robot 616 in FIG. 13-1) has a number of clamp devices 1560 that is equal to the number of gripping features 940 included on each article holder. For instance, each article holders 910, 920, and 930 in FIG. 9 has two gripping features 940. In such a case, an article handling robot would have two clamp devices 1560.

Each clamp device 1560 includes two opposing forks 1562. Each fork 1562 has an inner aperture having a width 1564. In an embodiment, the fork aperture width 1564 is greater than a diameter 1566 of the gripping feature bottom portion 942, and less than a diameter 1568 of the gripping feature top portion 941. Forks 1562 are illustratively moved towards each other in the directions shown by arrows 1563 by an actuator 1565 (e.g. hydraulic, pneumatic, or electric). Accordingly, opposing forks 1562 are able to clamp onto gripping feature 940 such that the associated article holder can be handled by the article handling robot. Similarly, once clamped onto an article holder, opposing forks 1562 can be moved by actuator 1565 in the opposite directions of arrows 1563 to release a gripping feature 940 and thus release an article holder.

FIG. 15-7 is a top-down schematic illustration of a hook device 1570 that can be used by a robot to handle (e.g. pick-up and carry) an article holder. In an embodiment, one or more hook devices 1570 can be used in place of a clamp device 1560 (shown in FIG. 15-6), or could be used in combination with a clamp device 1560. Similar to the clamp device 1560 discussed above, an article handling robot illustratively has a number hook devices 1570 that is equal to the number of gripping features 940 included on each article holder.

In an embodiment, a hook device 1570 is rigidly connected to robot arm (e.g. robot arm 616 in FIG. 13-1) such that the robot arm is able to control the motion and positioning of the hook device 1570 for example as is shown by arrow 1575. Hook device 1570 has a fork 1572 having an inner aperture width 1574. Fork width 1574 is illustratively greater than a diameter 1566 of the gripping feature bottom portion 942, and less than a diameter 1568 of the gripping feature top portion 941. Additionally, the inner aperture of the hook device 1570 has a depth 1576 that is illustratively greater than the diameter 1566 of the gripping feature bottom portion 942. Accordingly, an article handling robot can use hook device 1570 to handle an article holder by positioning the fork aperture 1574 around the gripping feature bottom portion 942 and then lifting the fork 1572 upward such that gripping feature top portion 941 is supported by the fork. The article handling robot can likewise release the article holder by moving the fork 1572 vertically down and away from the gripping feature top portion 941, and then moving the fork 1572 horizontally away from the gripping feature 940.

Figure 16:
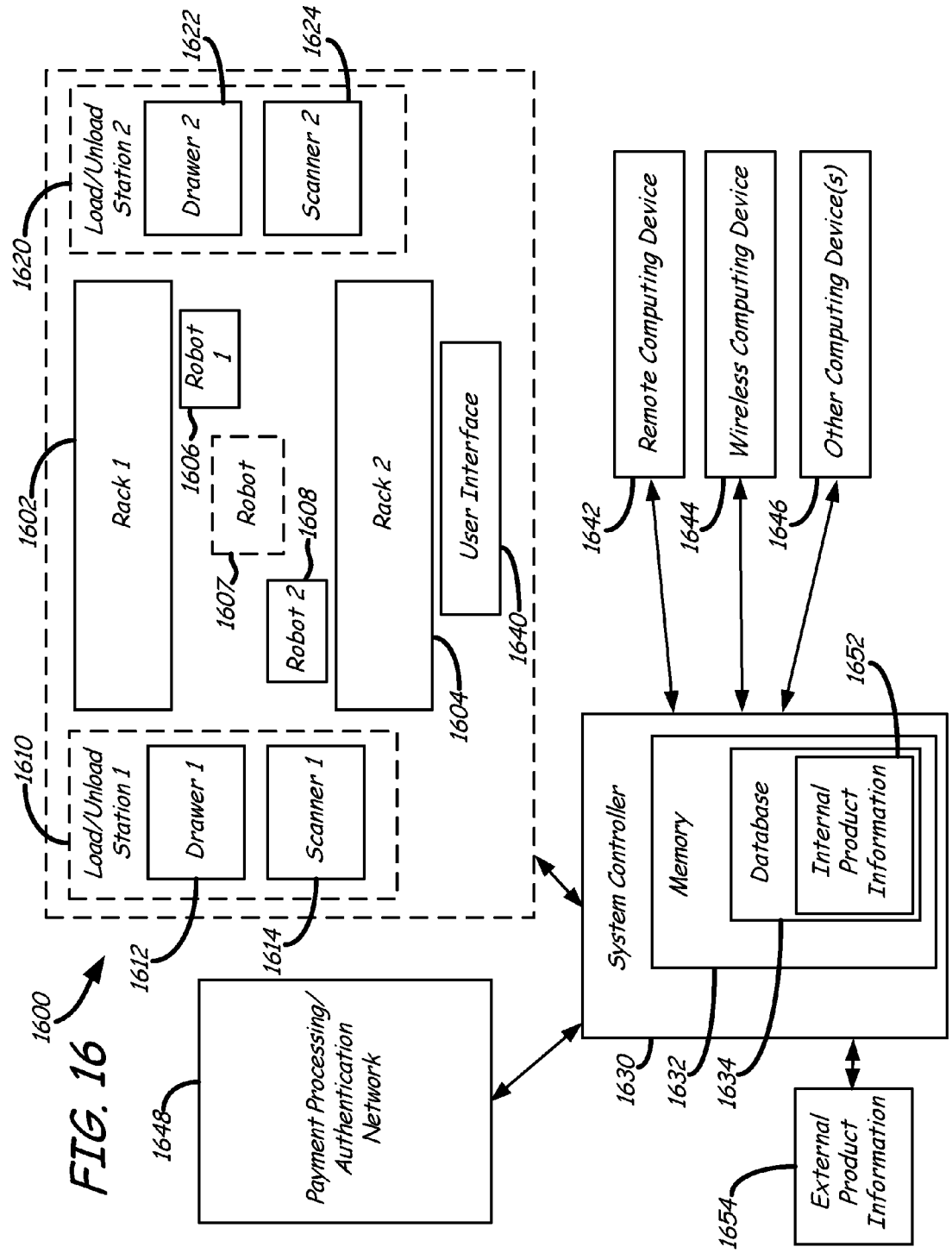
FIG. 16 is a schematic diagram of a multi-rack robotic storage and retrieval system.

FIG. 16 is a schematic top-down view of another embodiment of a robotic storage and retrieval system 1600. In the particular embodiment shown in the figure, system 1600 includes two racks 1602 and 1604. Embodiments are not however limited to having any particular number of racks and may optionally have any number of racks (e.g. 1, 2, 3, 4, etc.). Racks 1602 and 1604 may be racks such as rack 102 in FIG. 1-1 or rack 608 in FIG. 8. Racks 1602 and 1604 are not however limited to any particular configuration and can include configurations different than those shown in the drawings. Each rack 1602 and 1604 illustratively has a set of article holders at each unique row/column position along the rack.

In one embodiment, system 1600 includes one robot for each rack (e.g. robot 1606 for rack 1602, and robot 1608 for rack 1604). Each robot stores article holders to and retrieves article holders from its associated rack. In another embodiment, system 1600 includes only one robot (schematically illustrated at 1607), and the robot 1607 stores article holders to and removes article holders from all or a plurality of the racks in the system. Embodiments of system 1600 may however include any number of robots serving any number of racks, and embodiments are not limited to the described one or two robot embodiments. Additionally, in yet another embodiment of system 1600, the system does not include any robots and other mechanisms are used to store and retrieve article holders from the racks.

System 1600 optionally includes one or more article holder load/unload stations 1610 and 1620. Each station includes a drawer 1612/1622 and a scanning module 1614/1624. Each drawer 1612/1622 is illustratively able to hold any number of article holders, and each scanning module 1614/1624 is able to scan product identifiers (e.g. an RFID tag, a barcode, a SKU, etc.) of articles within the article holders. Scanning modules 1614/1624 may also be configured to scan identifiers (e.g. a one-dimensional barcode, a two-dimensional barcode, an RFID tag, etc.) associated with the article holders.

In one embodiment, articles are stored to a rack 1602/1604 by first placing articles within empty article holders held by one of the drawers 1612/1622. Once the article holders are filled with articles, one of the robots 1606/1608 removes each article holder from the drawer. The robot 1606/1608 may optionally scan or otherwise read an article holder identifier (e.g. two-dimensional barcode) before removing an article holder from the drawer. The robot 1606/1608 then positions the article holder within one of the scanning modules 1614/1624. The scanning modules 1614/1624 scan or otherwise read article identifiers (e.g. barcode, SKU) of articles within article holders. For example, in one embodiment, an article holder is transparent or translucent, and scanning modules 1614/1624 have multiple stationary light curtains that scan the article holder from multiple directions. In such a case, articles do not necessarily need to be put in an article holder in any particular orientation. Instead, articles can be placed in article holders in any, or in almost any orientation, and the scanning modules 1614/1624 are still able to read the article identifiers within the associated article holder operating environment. This may be advantageous in at least some situations in that it allows for flexibility in how articles are loaded into article holders. It should be noted however that, in another embodiment, articles may be placed in article holders in a particular orientation, and that embodiments of the present disclosure are not limited to any particular method of placing articles into article holders.

Once an article holder and article have been picked-up and identified, a system controller 1630 identifies an available (e.g. empty) location within the racks 1602 and 1604. For instance, the system controller 1630 illustratively has a database 1634 stored in a memory component 1632 that maintains a record of what article holder if any is located at each position within the racks. One of the robots 1606/1608 then transports the article holder and the article to one of the available locations. Additionally, the database 1634 is updated such that it keeps a record of the article holder identifier, the article identifier, and a position in the rack system such as the rack and the location within the rack where the article holder and article were stored. The same or similar process is then repeated to store additional articles to system 1600.

In the particular embodiment shown in FIG. 16, system 1600 includes two load/unload stations 1610 and 1620. This could allow for one station/drawer to be used to load articles to the system and for the other station/drawer to be used to store empty article holders once an article has been dispensed from an article holder. Alternatively, both stations 1610 and 1620 could be used at the same time to load articles to the system, or to store empty article holders. Furthermore, it should be noted that embodiments are not limited to any particular number or configuration of load/unload stations. Embodiments may include any number of load/unload stations (e.g. 0, 1, 2, 3, etc.) and may have configurations differing than those shown in the figure.

System 1600 also optionally includes a user interface module 1640 that has one or more dispensing stations where articles may be dispensed to an end user (e.g. a customer). The user interface module 1640 may also include other components such as, but not limited to, monitors, touchscreens, keyboards, mice, trackballs, barcode readers, RFID readers, credit card readers, bill changers, biometric sensors, etc. In an embodiment, user interface module 1640 enables multiple users to simultaneously query, review, and select articles. User interface module 1640 is also illustratively able to provide any other desired functions such as user authentication and payment processing. System 1600 could for example be communicatively coupled to a payment processing and/or authentication network 1648 to facilitate user authentication and/or payment processing.

In an embodiment, system controller 1630 is able to store and/or retrieve additional information about the articles stored within the racks. The additional information may be from an internal source 1652 (e.g. information stored to database 1634) and/or from an external source 1654 (e.g. information retrieved from an internet, cloud computing system, supplier database, etc.). Some examples of additional information include, for illustration purposes only and not by limitation, price information, warranty information, article description, article weight, article dimensions, categories associated with articles, popularity of articles, shipping availability, reviews, release dates, and product specifications (e.g. capacity, speed, color, material, duration, etc.).

The system controller 1630 illustratively provides access to the additional information through user interface 1640. For example, user interface 1640 can be used to perform query or data mining operations. Also for example, user interface 1640 can be used to search for or browse articles stored within the system. A user may for instance search for "MP3 players" and get a list returned on the user interface 1640 that lists all of the MP3 players stored within the rack. Alternatively, the articles within the rack can be categorized, and a user can browse the available articles by categories (e.g. "MP3 players," "DVDs," "CDs," "video games," etc.). Embodiments of the present disclosure are not however limited to any particular use of the additional information 1652/1654 and can use the additional information in any manner.

FIG. 16 further shows that system 1600 may be directly or indirectly communicatively coupled to other electronic devices such as a remote computing device 1642, a wireless computing device 1644, and other computing devices 1646. For instance, in one embodiment, a customer is able to query, review, and select articles utilizing a wireless computing device 1644 such as, but not limited to, a smartphone, a tablet, an e-reader, a personal digital assistant, an MP3 player, a netbook, or a notebook. Once the customer selects an article utilizing the wireless computing device 1644, he or she can pick-up the article from a dispensing station at user interface 1640. Also for instance, in another embodiment, a user can utilize a remote computing device 1642 such as, but not limited to, a personal computer, a notebook, or a workstation to remotely connect to system 1600 (e.g. through an internet, intranet, or WiFi network) and similarly query, review, and select articles. In one particular embodiment, for illustration purposes only and not by limitation, a customer utilizes a remote computing device 1642 to connect to a web store associated with system 1600 and utilizes the web store to retrieve articles from system 1600. The selected article can then be packaged and shipped to the user or another desired location. Embodiments are not however limited to any particular implementation and include any manner of querying, reviewing, and selecting articles. It should be noted that devices 1642, 1644, and 1644 illustratively have access to the additional product information 1652 and/or 1654 such that they can also search, browse, or mine the additional product information.

Figure 17:
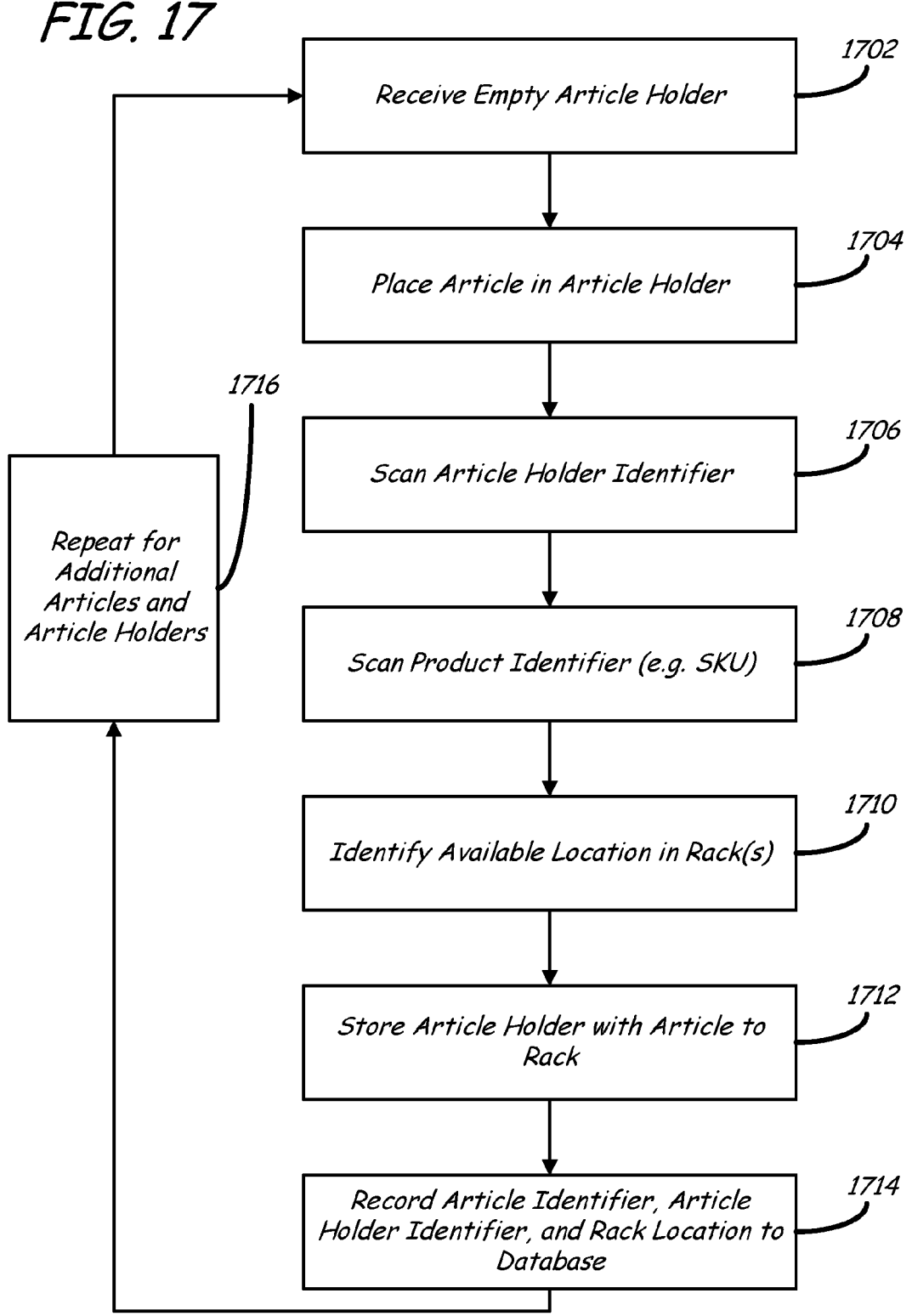
FIG. 17 is a flow diagram of a method of storing article holders.

FIG. 17 is a flow diagram illustrating one method of storing articles to a robotic storage and retrieval system. It should be understood however that not all steps may be necessary, and thus should not be considered limiting. Likewise, the order of steps may be changed if desired. At block 1702, empty article holders are received. For instance, in system 1600 in FIG. 16, empty article holders may be received or placed in one of the drawers 1612 or 1622. At block 1704, articles are placed in the article holders. The placement of articles in article holders may be performed using a manual process (e.g. a stock person placing articles in article holders) or may be performed using an autonomous or semi-autonomous process (e.g. conveyors or robots placing articles in article holders). At block 1706, an identifier associated with each article holder (e.g. a two-dimensional barcode or an RFID tag) is scanned, and at block 1708, an identifier associated with each article (e.g. a SKU, a barcode, or an RFID tag) is scanned. Embodiments of the present disclosure are not however limited to any particular manner of scanning or reading the article holder or article identifiers. One or both of the scans may be performed by a robot (e.g. robot 1606 or 1608 in FIG. 16), by a scanning module (e.g. modules 1614 or 1624 in FIG. 16), by a person, or by any combination of a robot, a scanning module, and a person.

At block 1710, the robotic storage and retrieval system identifies at least one available location within the rack or racks in which the article holder can be stored. A system may for example utilize a system controller to identify available locations from information stored in a database. At block 1712, the article holder is stored to one of the available locations identified at block 1710. Then, at block 1714, the system stores information to a database that identifies the article holder, the article within the article holder, and the position in the racks (e.g. rack 1, column 2, row 3, or position number 54) where the article holder was stored. Finally, at block 1716, the process is repeated for additional article holders and articles.

Figure 18:
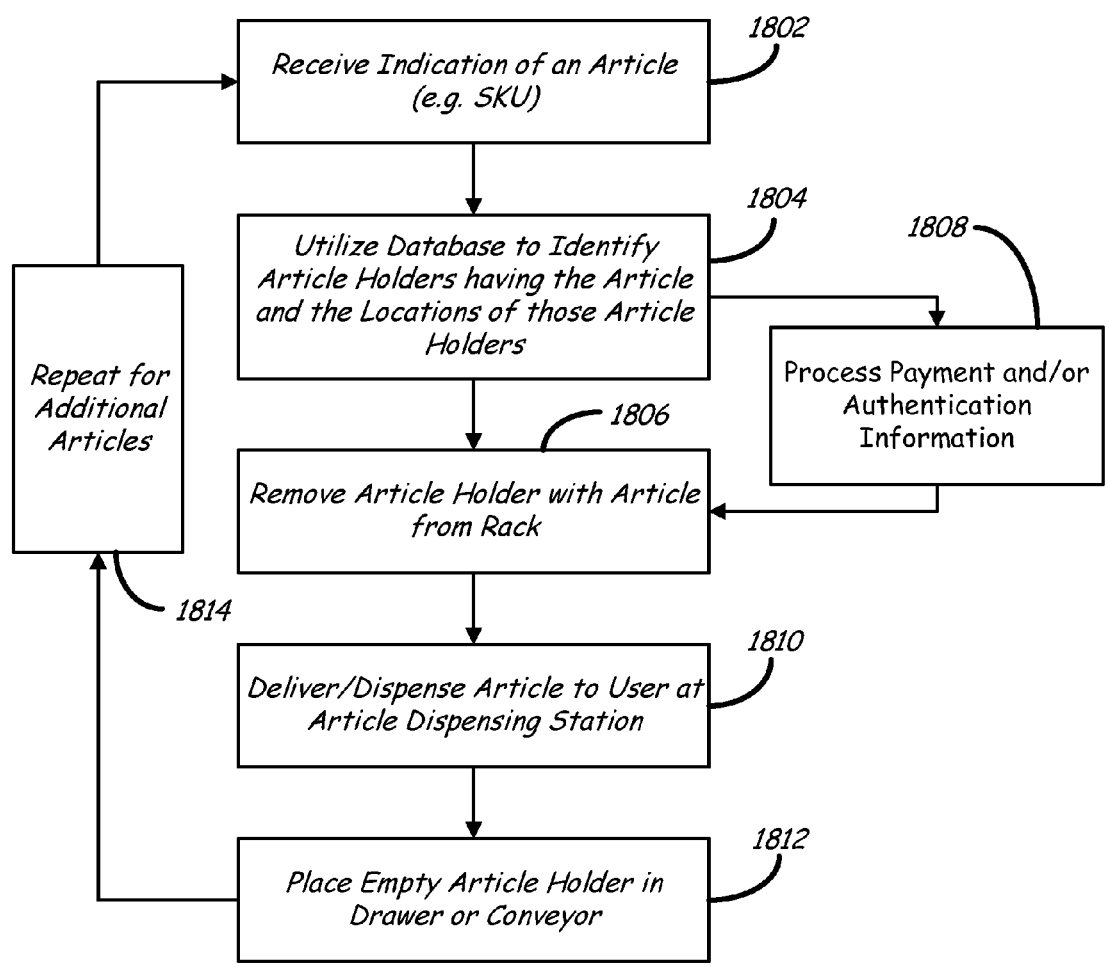
FIG. 18 is a flow diagram of a method of retrieving article holders.

FIG. 18 is a flow diagram illustrating one method of retrieving articles from a robotic storage and retrieval system. It should be understood however that not all steps may be necessary, and thus should not be considered limiting. Likewise, the order of steps may be changed if desired. At block 1802, the system receives an indication of an article to be retrieved. For instance, a database having information about articles stored in the system can be searched or browsed to identify articles that can be retrieved, and a user can select one of the articles. At block 1804, the system utilizes its database to identify one or more article holders that contain the selected article and the locations of those article holders. At block 1806, one of the article holders containing the desired article is removed from a rack using, for example, the scanning of the article holders at a position in the rack to obtain the desired article holder. At optional block 1808, the robotic storage and retrieval system may process payment information (e.g. credit card information) and/or perform an authentication step before continuing with the transaction. The system illustratively only continues the transaction if the payment processing and/or authentication is successful, and aborts/discontinues the transaction if the payment processing and/or authentication is not successful. At block 1810, the article is removed from the article holder and is placed in a dispensing station where it is can be retrieved (e.g. picked-up) such as by a user. At block 1812, the empty article holder is placed in a drawer (e.g. a drawer in a load/unload station) or on a conveyor, so that the article holder can be refilled with another article and stored back into a rack. Finally, at block 1814, the process is optionally repeated for additional articles.

Figure 19:
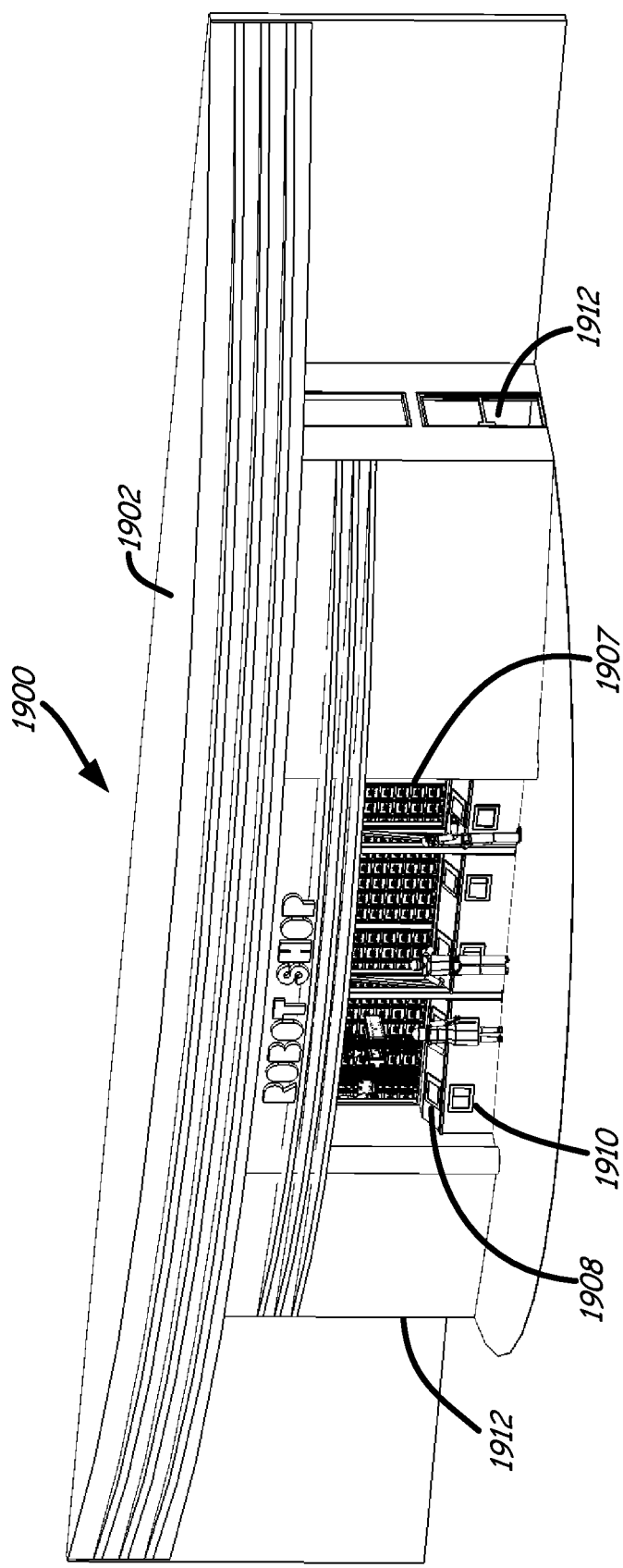
FIG. 19 is a perspective view of a multi-rack robotic storage and retrieval system with an outer housing and signage.

FIG. 19 is a perspective view of yet another embodiment of a robotic storage and retrieval system 1900. System 1900 illustratively includes an outer casing 1902 that may include one or more signage components 1904. Signage components 1904 can include fixed signage and/or electronic signage. The signage may indicate an organization (e.g. a retailer) associated with the system, a type or types of articles included within the system, or any other information. In one embodiment, such as in the embodiment shown in the figure, the outer casing 1902 may be opaque such that many internal components of system 1900 are hidden, while having a window 1907 to selectively allow users to see some aspects of the system.

In the particular embodiment shown in FIG. 19, the system 1900 includes five sets of user interfaces 1908 and associated dispensing stations 1910. User interfaces 1908 illustratively enable users to query, review, and select articles, and dispensing stations 1910 enable users to retrieve dispensed articles. Embodiments are not however limited to any particular number of user interfaces 1908 and dispensing stations 1910, and may include more or less (e.g. 0, 1, 2, 3, 4, 5, 6, etc.) than the illustrated five sets. Accordingly, embodiments can be configured to accommodate any number of simultaneous users. Additionally, system 1900 may also include one or more access panels 1912. Access panels 1912 can be used to load new articles into the system, to add or remove article holders, to service the system (e.g. preventative maintenance), etc.

Figure 20:
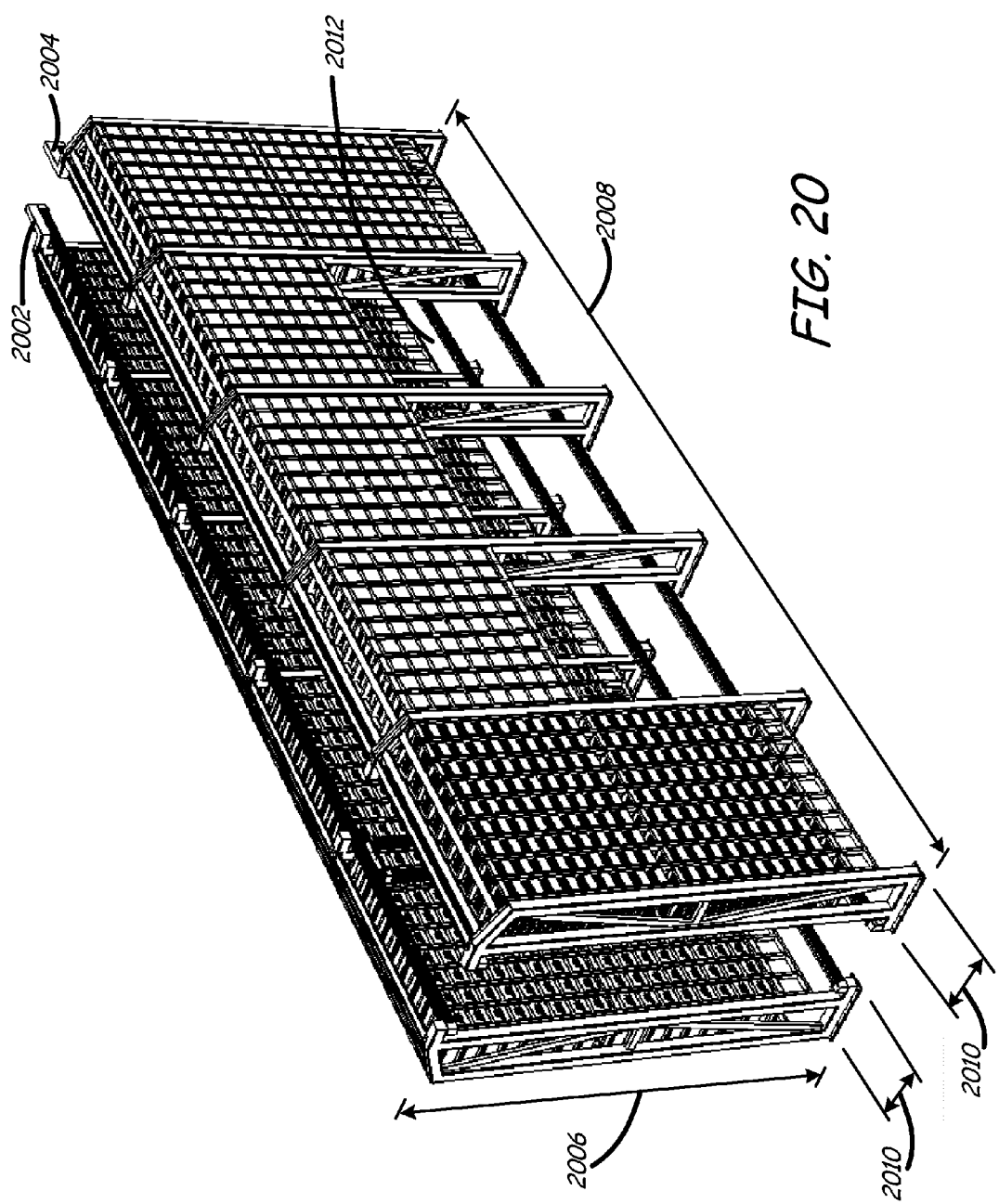
FIG. 20 is a perspective view of a multi-rack storage and retrieval system with an outer housing removed.

FIG. 20 is a perspective view of a rack system that may be used in a robotic storage and retrieval system. The system illustratively includes two racks 2002 and 2004. Embodiments of rack systems may however include any number of racks (e.g. 1, 2, 3, 4, etc.). Each rack 2002/2004 has a height 2006, a width 2008, and a depth 2010. In the particular embodiment shown in the figure, each rack has twenty-five columns of article holders along its width 2008, and sixteen rows of article holders along its height 2006. Embodiments can however have any number of columns and rows of article holders. Additionally, the depth 2010 of each row/column position can be configured to be any dimension such that any amount of article holders can be stored at each position. In one embodiment, positions within the rack system are identified by specifying a rack (e.g. rack 1, 2, 3), a row (e.g. row 1, 2, 3), and a column (e.g. column 1, 2, 3). For example, in block 1714 in FIG. 17, the system illustratively records an article holder identifier, an article identifier, a rack identifier, a row identifier, and a column identifier to a database. Finally with respect to FIG. 20, one or more racks (e.g. rack 2004) may have an empty portion(s) 2012 that facilitates access to user interfaces and/or dispensing stations (e.g. user interfaces 1908 and dispensing stations 1910 in FIG. 19).

It should be noted that in one embodiment of a system having multiple racks, each rack (e.g. racks 2002 and 2004 in FIG. 20) has its own robot to store and retrieve article holders from the rack. In one particular embodiment, each robot has a shuttle, and the robot and shuttle are the same or similar to robot 616 and shuttle 618 in FIG. 13-1. Embodiments are not however limited to any particular configuration and may include robots and/or shuttles different from those shown in the figures. In another embodiment, a multiple rack system does not include two sets of robots and shuttles, but instead only includes one robot and one shuttle that store and retrieve article holders from both racks.

It should be noted that embodiments of the present disclosure include any feature or combination of features described above or shown in the figures. For example, the two rack system shown in FIG. 20 may be implemented utilizing conveyors such as those shown in FIG. 1-1 or 7, or may alternatively be implemented without conveyors utilizing load/unload stations such as those shown in FIG. 16. Also for example, a database (e.g. database 1638 in FIG. 16) can be utilized with any of the robotic storage and retrieval systems. In other words, any feature described above or shown in the figures can be combined with any other feature described above or shown in the figures to implement a robotic storage and retrieval system.

Although the subject matter has been described in language specific to structural features and/or methodological acts, it is to be understood that the subject matter defined in the appended claims is not necessarily limited to the specific features or acts described above as has been determined by the courts. Rather, the specific features and acts described above are disclosed as example forms of implementing the claims.

What is claimed is:

1. A robotic storage and retrieval system comprising:
   a three-dimensional storage rack having a plurality of different rack positions and being configured to store a plurality of article holders at each of the rack positions, each article holder configured to hold an article and each plurality of article holders comprising a first article holder and a plurality of other article holders disposed on one side of the first article holder and extending away from the first article holder into the rack at each rack position, wherein at least for some of the different rack positions the article holders of the plurality of article holders are different sizes;
a system controller that determines which one of the article holders includes a selected article; and
a robotic retrieval system operably coupled to the system controller that removes the article holder with the selected article from the associated plurality of article holders and displaces the article holder to allow the selected article to fall out of the article holder.

2. The system of claim 1, wherein the article holders are transparent.

3. The system of claim 1, wherein each of the article holders is rigid and includes an opening of size to receive an article.

4. The system of claim 1, wherein the article holders comprise at least two different types of article holders.

5. The system of claim 1, wherein at least two of the plurality of article holders hold at least two different types of articles.

6. The system of claim 1, wherein the robotic retrievel system comprises a robot movable relative to the rack, and configured to remove the article holder with the selected article from the rack and to rotate the article holder to allow the selected article to fall out of the article holder.

7. The system of claim 6, the selected article is located in one of the plurality of article holders at a rack position, and wherein the robot is configured to displace the one of the plurality of article holders prior to removing the article holder with the selected article.

8. The system of claim 1, and further comprising:
a dispensing station at a selected location remote from the one or more racks and that is configured to receive each of the articles removed from an associated article holder.

9. The system of claim 8, wherein the dispensing station is associated with a user interface, said user interface configured to receive identification of the selected article.

10. The system of claim 9, wherein the user interface includes a query means configured to search the articles held in the plurality of article holders.

11. The system of claim 9, wherein the user interface includes a payment means configured to receive a payment for the selected article.

12. The system of claim 1, wherein each of the article holders comprises a gripping feature that enables the robotic retrieval system to pick-up and handle the article holder.

13. The system of claim 12 wherein the gripping feature on each article holder comprises vertically oriented projections spaced apart from each other on opposite sides of an opening of the article holder, each projection having a top portion larger than a bottom portion.

14. The system of claim 12, wherein each gripping feature includes a vision system target that enables the robotic retrieval system to align to the article holder.

15. The system of claim 14, wherein each gripping feature includes an identifier that uniquely identifies the article holder.

* * * * *